US012130404B1

(12) United States Patent
Olsson et al.

(10) Patent No.: US 12,130,404 B1
(45) Date of Patent: *Oct. 29, 2024

(54) BURIED OBJECT LOCATOR APPARATUS INCLUDING TWELVE NODES

(71) Applicant: SeeScan, Inc., San Diego, CA (US)

(72) Inventors: Mark S. Olsson, La Jolla, CA (US); Ray Merewether, La Jolla, CA (US); Sequoyah Aldridge, San Diego, CA (US); Ryan B. Levin, San Diego, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,285

(22) Filed: Aug. 11, 2023

Related U.S. Application Data

(63) Continuation of application No. 17/499,810, filed on Oct. 12, 2021, now Pat. No. 11,782,179, which is a continuation of application No. 16/125,768, filed on Sep. 10, 2018, now Pat. No. 11,156,737, which is a continuation of application No. 14/949,868, filed on Nov. 23, 2015, now Pat. No. 10,078,149, which is a continuation of application No. 13/469,024, filed on May 10, 2012, now Pat. No. 9,207,350.

(60) Provisional application No. 61/485,078, filed on May 11, 2011.

(51) Int. Cl.
*G01V 3/165* (2006.01)
*G01V 3/00* (2006.01)
*G01V 3/08* (2006.01)
*G01V 3/10* (2006.01)
*G01V 3/15* (2006.01)

(52) U.S. Cl.
CPC ............... *G01V 3/165* (2013.01); *G01V 3/00* (2013.01); *G01V 3/081* (2013.01); *G01V 3/104* (2013.01); *G01V 3/15* (2013.01)

(58) Field of Classification Search
CPC .......... G01V 3/00; G01V 3/081; G01V 3/104; G01V 3/15; G01V 3/165
See application file for complete search history.

(56) References Cited

U.S. PATENT DOCUMENTS

| 4,274,127 A | 6/1981 | Beck et al. |
| 7,741,848 B1 | 6/2010 | Olsson et al. |
| 2008/0186010 A1 | 8/2008 | Skultety-Betz et al. |
| 2010/0188245 A1 | 7/2010 | Nielsen et al. |

FOREIGN PATENT DOCUMENTS

CN 2219043 Y 2/1996

OTHER PUBLICATIONS

International Searching Authority, "Written Opinion of the International Searching Authority" for PCT Patent Application No. PCT/US12/037397, Nov. 12, 2013, European Patent Office, Pays Bas.

*Primary Examiner* — Jay Patidar
(74) *Attorney, Agent, or Firm* — Steven C. Tietsworth, Esq.; Michael J. Pennington, Esq.

(57) ABSTRACT

Buried utility locators including a locator body and twelve antenna coils are disclosed.

20 Claims, 41 Drawing Sheets

One Embodiment of A Locator with Omnidirectional Safety Lights Positioned Near the Bottom One Embodiment of a Safety Light Assembly Example Planar Elliptical/Fan Beam Pattern from Safety Light (Side View)

Example Planar Elliptical/Fan Beam Pattern from Safety Light (Top View)

*Another Embodiment of a Safety Light Assembly*

One Embodiment of a Safety Light LED, Reflector and Lens Apparatus

One Embodiment of a Safety Light Assembly

*Another Embodiment of A Locator with Omnidirectional Safety Lights Positioned Near the Top*

Another Embodiment of A Locator with Omnidirectional Safety Lights

Example Embodiments of Pre-Defined Safety Lighting Outputs

*Another Embodiment of A Locator with Omnidirectional Safety Lights*

*Another Embodiment of A Locator with Omnidirectional Safety Lights*

BURIED OBJECT LOCATOR APPARATUS INCLUDING TWELVE NODES

CROSS-REFERENCE TO RELATED APPLICATIONS

This application is a continuation of and claims priority to co-pending U.S. patent application Ser. No. 14/949,868, entitled BURIED OBJECT LOCATORS WITH DODECAHEDRAL ANTENNA NODES, filed on Nov. 23, 2015, which is a continuation of and claims priority to U.S. patent application Ser. No. 13/469,024, entitled BURIED OBJECT LOCATOR APPARATUS WITH SAFETY LIGHTING ARRAY, filed on May 10, 2012, now U.S. Pat. No. 9,207,350, which claims priority under 35 U.S.C. § 119 (e) to U.S. Provisional Patent Application Ser. No. 61/485,078, entitled LOCATOR ANTENNA CONFIGURATION, filed on May 11, 2011. The content of each of these applications is incorporated by reference herein in its entirety for all purposes.

FIELD

This disclosure relates generally to electronic systems and sensing antennas for safely locating and mapping buried or otherwise inaccessible pipes and other conduits, cables, conductors and inserted transmitters. More specifically, but not exclusively, the disclosure relates to buried object locators with dodecahedral antenna nodes or arrays and/or locators having integral GPS antennas and/or lighting to provide accurate location information and enhance operator safety.

BACKGROUND

With the evolution of more complex infrastructures requiring enhancement, replacement, and expansion in all areas of human occupation, and in particular high-density areas such as cities and suburbs, the ability to accurately map the location of buried conduits, wires and pipelines of various sizes and kinds becomes more pressing, as does the need to document actual as-built underground installations before they are covered so that they can be precisely located at a later date. Worker safety when performing location operations is very important, and workers using various locator devices are killed each year due to lack of visibility to automobiles and other vehicles.

Location operations frequently require the location and identification of existing underground utilities such as underground power lines, gas lines, phone lines, fiber optic cable conduits, cable television (CATV) cables, sprinkler control wiring, water pipes, sewer pipes, etc., collectively and individually herein referred to as "buried objects." As used herein, the term "buried objects" includes buried and hidden objects, such as objects located inside walls, between floors in multi-story buildings or cast into concrete slabs, for example, as well as objects disposed below the surface of the ground.

The unintended destruction of power and data cables may seriously disrupt the comfort and convenience of residents and bring huge financial costs to business. Therefore human-portable buried object locators (also denoted herein as "utility locators" or just "locators" for brevity) have been developed that sense electromagnetic signals to locate buried utilities such as pipes, conduits, and cables (also known as performing a "locate" or "line trace"). If the buried conductors carry their own electrical signal, they can be traced by detecting the emitted signals at their corresponding frequency. In addition, signals with a known frequency may also be applied to pipes, wires, and cables via a transmitter to enhance the ease and accuracy of the line tracing. This can be done with an electrical clip in the case of a pipe, or with an inductive coupler in the case of a shielded conductor. Sometimes small transmitters known as sondes are used to trace the location of pipes. These are inserted into a pipe and emit electromagnetic signals at a controlled frequency that may be selected for a particular location operation or environment.

Portable utility locators typically carry one or more antennas that are used to detect the electromagnetic signals emitted by buried pipes and cables, and sondes that have been inserted into pipes, typically in the form of magnetic field antennas. The accuracy of portable utility locators is limited by the sensitivity and the configuration of their antennas and associated signal processing circuitry. Signal interference caused by capacitance or inductance within the antenna structures can cause resonance and interference. Additionally, methods of processing signals detected by antennas in portable utility locators by amplifying them and mixing them, may suffer from inefficiencies which include vulnerability to radio-frequency interference (RFI) and electromagnetic interference (EMI), and the introduction of undesirable capacitance and inductance.

Accordingly, there is a need in the art to address the above-described as well as other problems.

SUMMARY

This disclosure relates generally to electronic systems and sensing antennas for safely locating and mapping buried or otherwise inaccessible pipes and other conduits, cables, conductors and inserted transmitters. More specifically, but not exclusively, the disclosure relates to buried object locators with dodecahedral antenna nodes or arrays and/or locators having integral GPS antennas and/or lighting to provide accurate location information and enhance operator safety.

For example, in one aspect, the disclosure relates to a buried object locating system (also denoted herein as a "locator" for brevity) includes a spherical enclosure of a predefined volume and an array of sensing antenna coils, where each of the sensing antenna coils is oriented approximately equidistantly from an antenna array center point and where the sensing axis of each sensing antenna coil intersects or nearly intersects the center point of the antenna array. In one aspect, a locating system includes three antenna arrays, one of which includes at least one GPS antenna, while others may each contain as many as twelve locator antenna coils or more.

In another aspect, the disclosure relates to an antenna node. The antenna node may include, for example, a node housing. The antenna node may further include an antenna assembly. The antenna assembly may include an antenna array support structure, and an interior omnidirectional antenna array disposed on the antenna array support structure.

In another aspect, the disclosure relates to a buried object locator. The buried object locator may include, for example, a processing and display module, a locator mast, and one or more antenna nodes coupled to the locator mast. The antenna nodes may each include a node housing and an antenna assembly. The antenna assembly may include an antenna array support structure, an interior omnidirectional antenna array disposed on the antenna array support structure, and supplementary antennas and/or sensors.

In another aspect, the disclosure relates to an antenna assembly for use in locator devices, including an omnidirectional antenna array. The antenna assembly may include a plurality of coils disposed in diametrically opposed pairs, such as top and bottom coils, for example.

In another aspect the disclosure relates to an array of LEDs combined with beam-forming optical elements such as TIR reflectors in a safety light assembly. The safety light assembly may be used as a safety feature on a locator or other man-portable or movable device. A safety light assembly may, for example, be formed or molded into part of an antenna body or housing, or separately attached to a locator body or other device or system.

In another aspect, the disclosure relates to a time multiplexing method. The method may, for example, be used to interpret signals from an omnidirectional antenna array wherein the antenna coils may be wired allowing switching between each diametric pair of antenna coils.

In another aspect, the disclosure relates to a method of computing a target field location from the responses of as many as twelve or more coils in an antenna array.

In another aspect, the disclosure relates to a device for locating buried or hidden objects. The device may include, for example, a locator housing or body. The device may further include one or more antenna nodes coupled to the body. The device may further include a safety lighting assembly. The safety lighting assembly may be configured to generate an output light beam in a predefined beam pattern. The beam pattern may be a substantially planar beam pattern. The beam pattern may be generated to provide high visibility of light in a predefined ray or plane, such as a plane perpendicular to a vertical axis of the housing or body. The light assembly may be disposed on or within the body or housing.

In another aspect, the disclosure relates to an antenna node. The antenna node may include, for example, a node housing and twelve antenna coils disposed on or within the housing. The twelve antenna coils may be spaced substantially equidistance from one another. The twelve antenna coils may be arranged in an approximately spherical shape.

In another aspect, the disclosure relates to a device for locating buried or hidden objects. The device may include, for example, a locator body and one or more dodecahedral antenna nodes coupled to the body. The body may be an integral body. The body may include a mast and a head unit. The one or more dodecahedral antenna nodes may be disposed on or within the masts.

In another aspect, the disclosure relates to a device for locating buried or hidden objects. The device may include, for example, a body. The device may further include or more antenna nodes coupled or within the body. The device may further include a plurality of GPS antennas coupled to or within the body.

Various additional aspects, features, and functions are described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Overview

Figure 1:
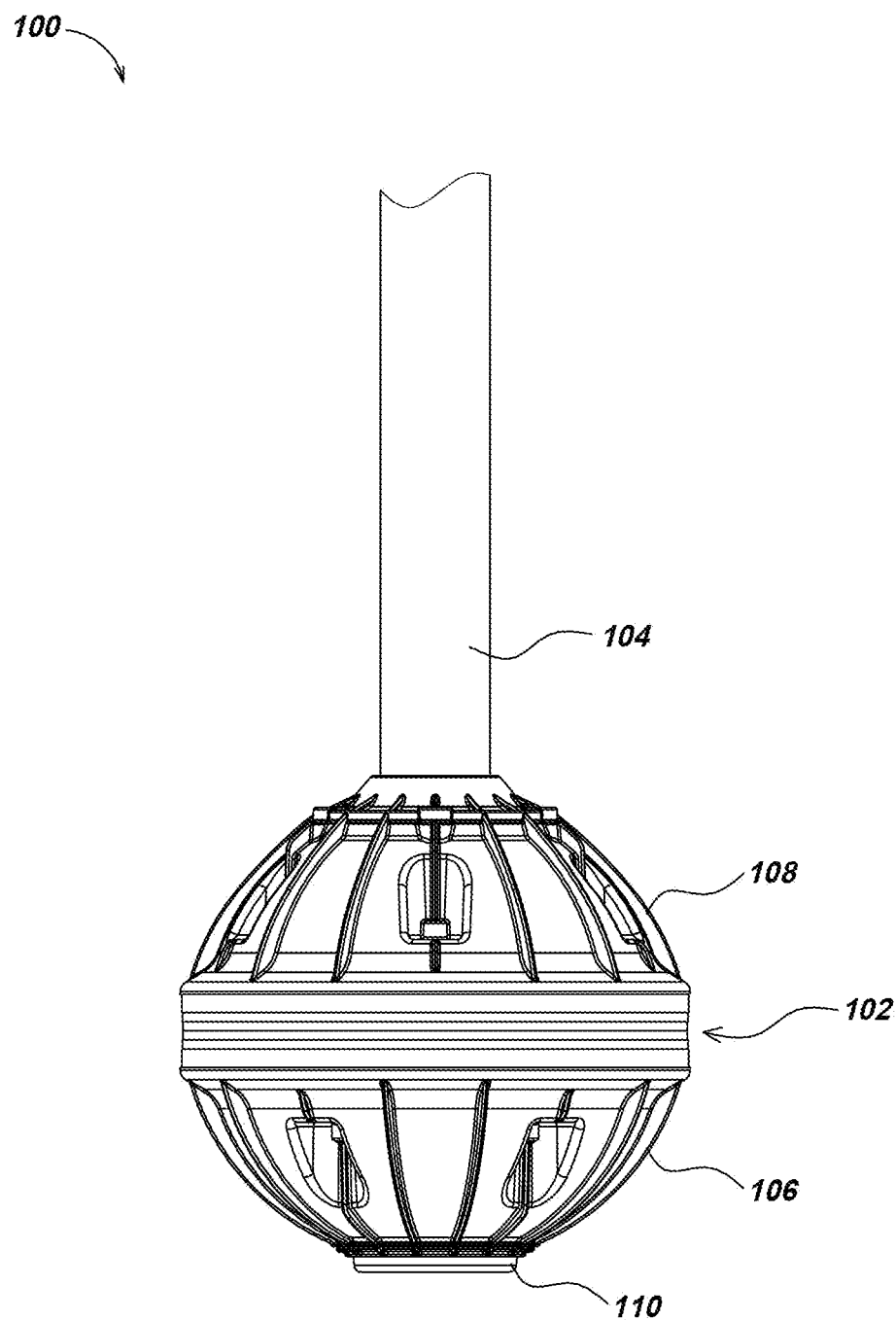
FIG. 1 illustrates an embodiment of a dodecahedral antenna array enclosure and mast.

This disclosure relates generally to electronic systems and sensing antennas for safely locating and mapping buried or otherwise inaccessible pipes and other conduits, cables, conductors and inserted transmitters. More specifically, but not exclusively, the disclosure relates to buried object locators with dodecahedral antenna nodes or arrays and/or locators having integral GPS antennas and/or lighting to provide accurate location information and enhance operator safety.

For example, in one aspect, the disclosure relates to a buried object locating system (also denoted herein as a "locator" for brevity) includes a spherical enclosure of a predefined volume and an array of sensing antenna coils, where each of the sensing antenna coils is oriented approximately equidistantly from an antenna array center point and where the sensing axis of each sensing antenna coil intersects or nearly intersects the center point of the antenna array. In one aspect, a locating system includes three antenna arrays, one of which includes at least one GPS antenna, while others may each contain as many as twelve locator antenna coils or more.

The antenna assembly may include, for example, an antenna array support structure, an interior omnidirectional antenna array disposed on the antenna array support structure, and a gradient antenna array disposed about the omnidirectional antenna array. The support structure assembly may be configured to position a plurality of coils of the interior omnidirectional antenna array in orthogonal directions. The omnidirectional antenna array may include four or more antenna coils configured to sense magnetic signals in two or more orthogonal directions. The omnidirectional antenna array may include twelve antenna coils, for example, configured to sense electromagnetic signals in twelve orthogonal directions.

In another aspect, the disclosure relates to an antenna node. The antenna node may include, for example, a node housing. The antenna node may further include an antenna assembly. The antenna assembly may include an antenna array support structure, and an interior omnidirectional antenna array disposed on the antenna array support structure.

The antenna node may further include a printed circuit board (PCB). The PCB may include a processing element configured to process signals generated from the omnidirectional antenna array and/or supplementary antennas. The PCB may further include a switching circuit. The switching circuit may be configured to selectively switch pairs of signals provided from one or more of the antenna arrays.

In another aspect, the disclosure relates to a buried object locator. The buried object locator may include, for example, a processing and display module, a locator mast, and one or more antenna nodes coupled to the locator mast. The antenna nodes may each include a node housing and an antenna assembly. The antenna assembly may include an antenna array support structure, an interior omnidirectional antenna array disposed on the antenna array support structure, and supplementary antennas and/or sensors.

In another aspect, the disclosure relates to an antenna assembly for use in locator devices, including an omnidirectional antenna array. The antenna assembly may include a plurality of coils disposed in diametrically opposed pairs, such as top and bottom coils, for example.

The diametric pairs of antenna coils may be wired in anti-series to connect negative terminals of each of diametric pair of gradient antenna coils together to perform a signal differencing process. The antenna assembly may further include a switching circuit configured to selectively switch signals from the antenna coil pairs. The signals may be switched based on a frequency schema which may, for example be based on the least common multiple of a plurality of frequencies of received signals.

In another aspect the disclosure relates to an array of LEDs combined with beam-forming optical elements such as TIR reflectors in a safety light assembly. The safety light assembly may be used as a safety feature on a locator or other man-portable or movable device. A safety light assembly may, for example, be formed or molded into part of an antenna body or housing, or separately attached to a locator body or other device or system.

In another aspect, the disclosure relates to a time multiplexing method. The method may, for example, be used to interpret signals from an omnidirectional antenna array wherein the antenna coils may be wired allowing switching between each diametric pair of antenna coils.

In another aspect, the disclosure relates to a method of computing a target field location from the responses of as many as twelve or more coils in an antenna array.

In another aspect, the disclosure relates to a device for locating buried or hidden objects. The device may include, for example, a locator housing or body. The device may further include one or more antenna nodes coupled to the body. The device may further include a safety lighting assembly. The safety lighting assembly may be configured to generate an output light beam in a predefined beam pattern. The beam pattern may be a substantially planar beam pattern. The beam pattern may be generated to provide high visibility of light in a predefined ray or plane, such as a plane perpendicular to a vertical axis of the housing or body. The light assembly may be disposed on or within the body or housing.

The safety lighting assembly may include, for example, a plurality of LED light units for generating fan-shaped output light beams, such as in an elliptical beam pattern. The LED light units may include one or more high powered LEDs. The LED light units may include a reflector and/or optics to control the shape of the output light beam patterns. The optics may be lenses, gratings, prisms, and/or combinations of these and/or other optical elements to shape light outputs.

The body may include, for example, a mast. The safety lighting assembly may be disposed on the mast or an equivalent element. The body may be an integral body, and the safety lighting assembly may be disposed on or within the integral body. The integral body may be formed as a single molded or formed element or may include two or more body elements. The body may include a head unit. The safety lighting assembly may be disposed on or within the head unit. The head unit may include one or more user interfaces, such as switches, displays, keypads, and the like. The head unit may include one or more electronic circuits, such as analog or digital circuits, processing elements, or other circuit elements, such as switches, controls, or other electronic or optical components. The safety lighting assembly may be disposed on or within one or more of the antenna nodes. The safety lighting assembly may be disposed on or within other nodes, such as nodes including GPS antennas and/or sensors, such as receivers and signal processors, ISM antennas and/or sensors, or other nodes.

The device may include one or more antenna nodes. At least one of the one or more antenna nodes may be a dodecahedral antenna node including twelve antenna coils. The dodecahedral antenna node may include an upper half shell and a lower half shell. Each of the upper half shell and the lower half shell may include or contain six of the antenna coils. The six antenna coils may be configured as five antenna coils equally distributed around a vertical axis and one centered antenna coil. The six antenna coils may be configured in a substantially hemispherical structure within a top or bottom half of the antenna node. Alternately, or in addition, at least one of the one or more antenna nodes may include a gradient antenna node. The gradient antenna node may include a plurality of substantially orthogonally arranged antenna coils, and a pair of gradient antenna coils. The gradient antenna coils may be disposed opposite to each outer outside the orthogonally arranged antenna coils.

The device may further include, for example, a plurality of GPS antennas. The plurality of GPS antenna may be coupled to or disposed within the body. The plurality of GPS antennas may be disposed in an upper antenna node. The upper antenna node may be positioned above the one or more antenna nodes, such as near or below a head unit. The device may include one or more GPS sensors coupled to the plurality of GPS antennas. The GPS sensors may include GPS receivers and/or GPS signal processing circuits or modules. The GPS antennas may be patch antennas. The patch antennas may be disposed on or within a printed circuit board or other circuit element. The GPS antennas may consist of three patch antennas. The three patch antenna may be oriented approximately 120 degrees apart on a circuit element.

The device may further include, for example, one or more ISM antennas coupled to or disposed within the body. The device may include one or more ISM radio modules coupled to the ISM antennas. The ISM radio modules may be ISM transmitter and/or receiver modules.

The LED light units may include, for example, a high power LED, a reflector element, and an optic to form the output light beam pattern. The fan shaped beams may be substantially planar. The plane may be a plane perpendicular to a vertical axis of the body. The output light pattern may be elliptical in shape.

The safety light assembly may, for example, include one or more processing elements, wherein the processing element controls the light output from the plurality of LEDs in a predefined output light pulse pattern. The processing element may be the same as or shared with a head unit processing element, such as a processing element in the head for determining information about a buried object, such as depth or direction. The predefined pattern may include a pulse train of light outputs followed by an off period. The pulse shape may be rectangular or a rounded pulse shape. The pulse train may consist of three output light pulses followed by the off period. The device may further include a camera. The device may further include a surface light assembly. The surface light assembly may be configured to generate a light beam downward towards the ground or other surface. The surface light assembly may be configured to direct light towards an area of the ground being imaged by the camera. The camera may be a still and/or video camera.

In another aspect, the disclosure relates to an antenna node. The antenna node may include, for example, a node housing and twelve antenna coils disposed on or within the housing. The twelve antenna coils may be spaced substantially equidistance from one another. The twelve antenna coils may be arranged in an approximately spherical shape.

The antenna coils may, for example, be positioned to form a twelve sided regular polygon. The node housing may include an upper shell and a lower shell. Six of the antenna coils may be mounted in support areas of the upper shell and six of the antenna coils may be mounted in support areas of the lower shell. The antenna coils may include a metal core having open ends and including a plurality of ridges spaced substantially equally apart, a connector coupling the open ends, an insulating layer coupled to the metal core, and multiple strands of wire wrapped on the insulating layer.

In another aspect, the disclosure relates to a device for locating buried or hidden objects. The device may include, for example, a locator body and one or more dodecahedral antenna nodes coupled to the body. The body may be an integral body. The body may include a mast and a head unit. The one or more dodecahedral antenna nodes may be disposed on or within the masts.

The dodecahedral antenna nodes may include a node housing and twelve antenna coils disposed within the housing. The twelve antenna coils may be substantially equally spaced. The twelve antenna coils may be configured in a substantially spherical configuration. The node housing may include an upper half shell and a lower half shell. Six of the antenna coils may be mounted in support areas of the upper shell and six of the antenna coils may be mounted in support areas of the lower shell. The antenna coils may include a metal core having open ends and including a plurality of ridges spaced substantially equally apart, a connector coupling the open ends, an insulating layer coupled to the metal core, and multiple strands of wire wrapped on the insulating layer. Alternately, or in addition, at least one of the one or more antenna nodes may be a gradient antenna node including a plurality of orthogonally arranged antenna coils and a pair of gradient antenna coils.

The device may further include, for example, a plurality of GPS antennas. The plurality of GPS antenna may be coupled to or disposed within the body. The plurality of GPS antennas may be disposed in an upper antenna node. The upper antenna node may be positioned above the one or more antenna nodes, such as near or below a head unit. The device may include one or more GPS sensors coupled to the plurality of GPS antennas. The GPS sensors may include GPS receivers and/or GPS signal processing circuits or modules. The GPS antennas may be patch antennas. The patch antennas may be disposed on or within a printed circuit board or other circuit element. The GPS antennas may consist of three patch antennas. The three patch antenna may be oriented approximately 120 degrees apart on a circuit element.

The device may further include, for example, one or more ISM antennas coupled to or disposed within the body. The device may include one or more ISM radio modules coupled to the ISM antennas. The ISM radio modules may be ISM transmitter and/or receiver modules.

The device may further include a camera. The device may further include a surface light assembly. The surface light assembly may be configured to generate a light beam downward towards the ground or other surface. The surface light assembly may be configured to direct light towards an area of the ground being imaged by the camera. The camera may be a still and/or video camera.

In another aspect, the disclosure relates to a device for locating buried or hidden objects. The device may include, for example, a body. The device may further include or more antenna nodes coupled or within the body. The device may further include a plurality of GPS antennas coupled to or within the body.

The device may further include, for example, a plurality of GPS sensors coupled to the plurality of GPS antennas. The device may include an upper antenna node. The GPS antennas may be disposed on or within the upper antenna node. The GPS antennas may be patch antennas. The patch antennas may be disposed on a printed circuit board or other circuit element. The GPS antennas may consist of three patch antennas. The three patch antenna may be spaced approximately 120 degrees apart. The body may include a mast, and the plurality of GPS sensors and/or GPS antennas may be coupled to the mast. The device may include one or more ISM antennas coupled to or within the body. The device may include one or more ISM transmitters and/or receivers coupled to or within the body.

One or more of the antenna modes may be, for example, a dodecahedral antenna node. Alternately, or in addition, one or more of the antenna nodes may be a gradient antenna node. The gradient antenna node may include a plurality of orthogonally arranged antenna coils and a pair of gradient antenna coils.

Various additional aspects, features, and functions are described below in conjunction with the appended Drawings.

Traditional buried utility locators typically use single or multiple unidirectional antennas consisting of a ferrite core with a copper coil wrapped around it. In co-assigned U.S. Pat. No. 7,009,399 a locator with an omnidirectional antenna configuration is disclosed. In this omnidirectional antenna, three orthogonal antenna coils are nested in a spherical form, each providing a separate signal to the locator's processor element for determining the location of buried or hidden objects. Co-assigned U.S. Pat. No. 7,518,374 discloses side-wheel configured gradient antennas separate from the an omnidirectional signal antenna. The content of each of these patents is incorporated by reference herein in its entirety. Certain embodiments as further disclosed herein may be combined with the teachings of these patents and/or other incorporated or referenced patents or patent publications noted herein to include safety lighting functionality, ground and/or surface lighting functionality, cameras for acquiring images and/or video, audio sensors, GPS and/or Instrumentation, Scientific, and Measurement (ISM) radio functionality, and/or dodecahedral antenna nodes in locators or other man-portable devices or system.

Example Locator Embodiments

Referring to FIG. 1, in one embodiment in accordance with certain aspects, a single antenna node or module 100 may incorporate a plurality of separate antenna coils enclosed with a single approximately spherical case 102, and may be positioned at or near the lower end of a locator mast 104 (when oriented upright relative to gravity and a ground surface as shown), which may be a component of a locator body. In other configurations, a structure similar or equivalent to module 100 may be disposed on or within a locator body or housing. The spherical case 102 may include a lower shell 106 joined to an upper shell 108 and/or other mechanical elements (not shown). A removable bottom cover 110 may cover an adaptor port to which auxiliary devices such as a fault-finding module, for example, may be attached and connected electrically to the locator.

Figure 2:
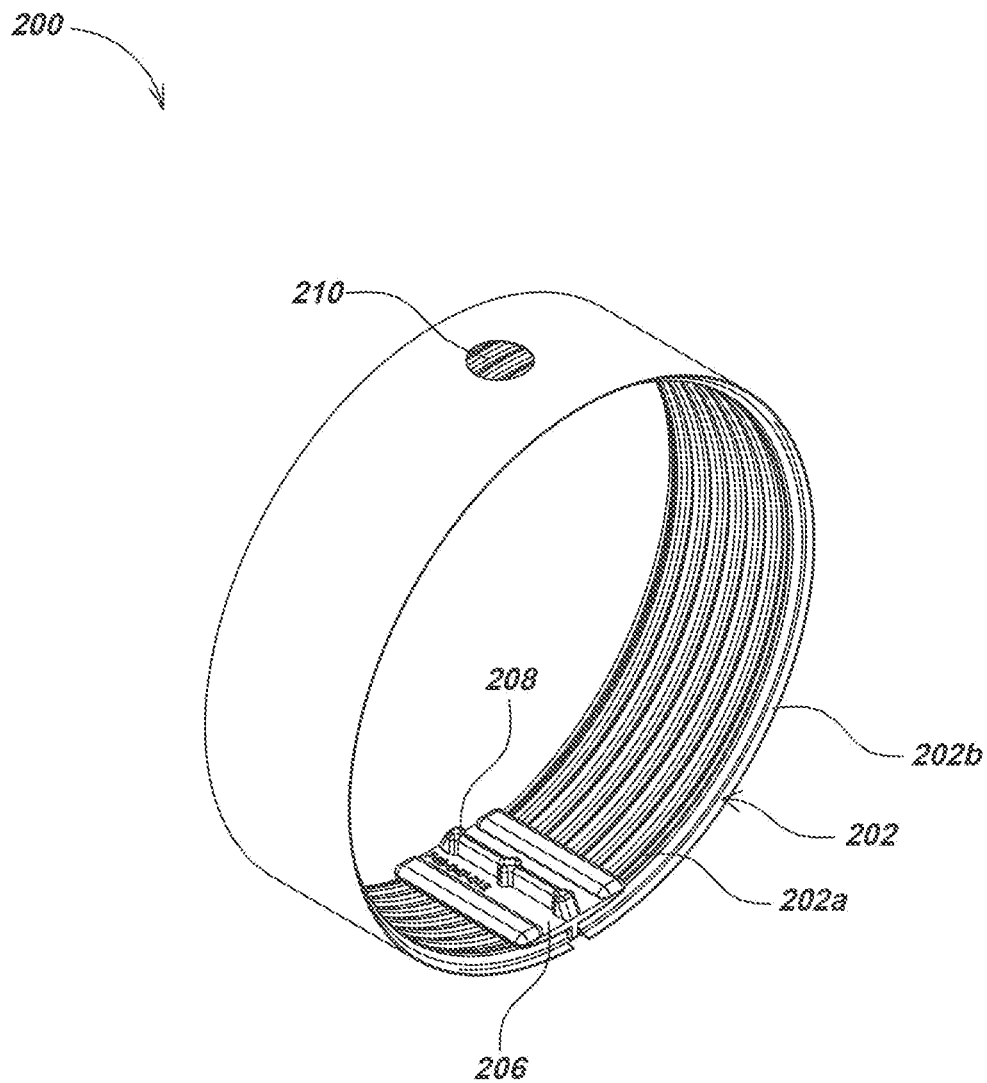
FIG. 2 is an enlarged isometric view of an embodiment of an individual coil in the antenna array.

Referring to FIG. 2, an example configuration of an embodiment of a single antenna coil 200, as may be used in an antenna node or module such as shown in FIG. 1, is illustrated. A metal core 202, which may be a thin metal structure formed with a plurality of ridges 202*a* defining a series of U-shaped grooves that may be substantially equally spaced apart axially. The two ends of the core may be spaced a short distance from each other and secured by a plastic connector 206 formed with a central riser 208. The grooves on the outer surface of the metal core 202 may be wound with multiple strands of an insulated wire 210 resting on an insulating layer 202*b* which may be composed of a low dielectric material such as Teflon® tape. The configuration and structure of an individual antenna coil may be as disclosed in, for example, co-assigned U.S. patent application Ser. No. 12/367,254, entitled LOCATOR ANTENNA WITH CONDUCTIVE BOBBIN, filed Feb. 6, 2009, the content of which is incorporated by reference herein in its entirety.

Figure 3:
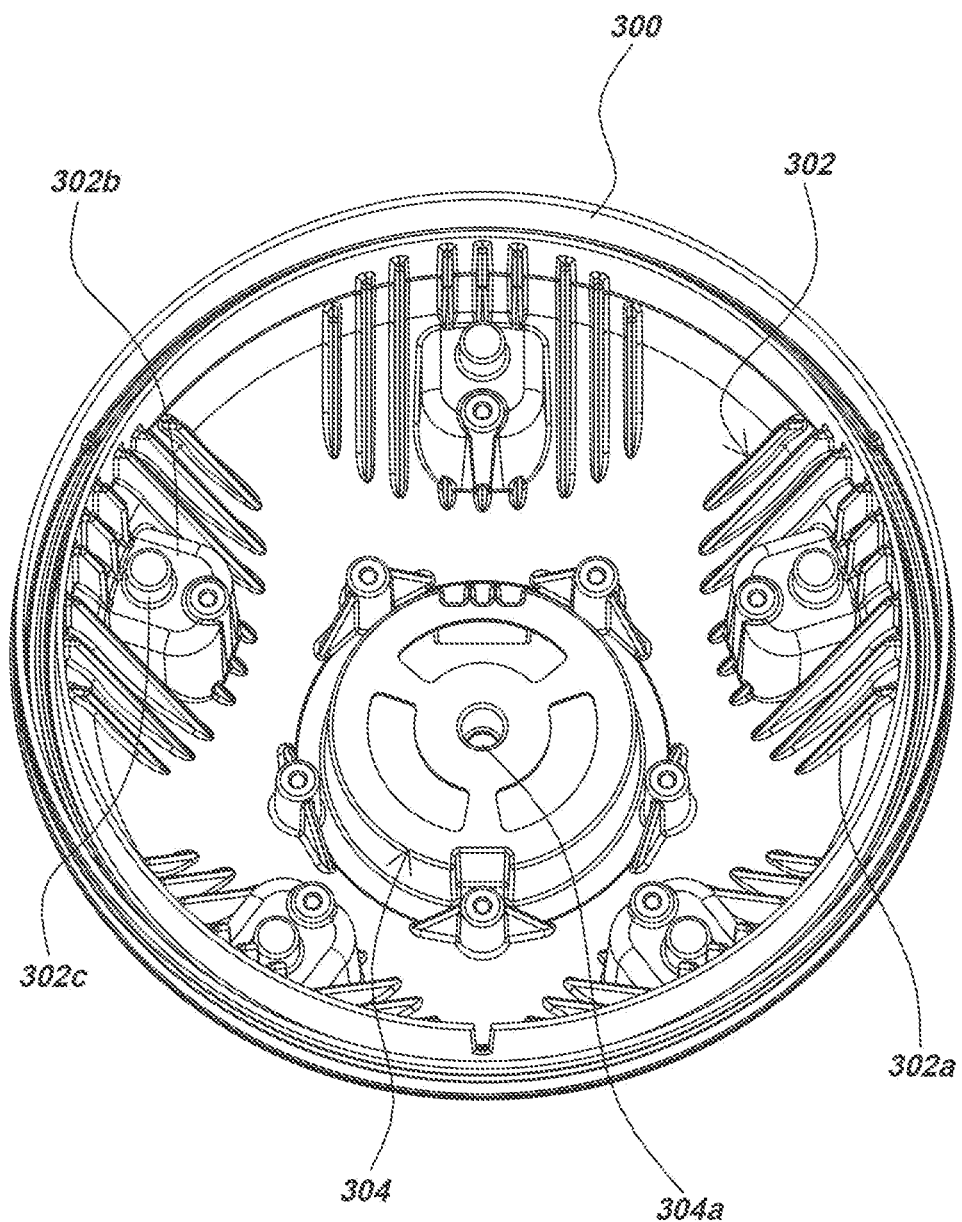
FIG. 3 illustrates a lower casing of an embodiment of an antenna array housing.

Turning to FIG. 3, the structure of the lower shell 106 and the upper shell 108 (FIG. 1) may be similar to each other to allow mating in a substantially spherical form. An outer, hemispherical shell 300 may be formed, for example, with five equally distributed instances of a molded support area such as 302 around its lower midpoint, each of the support areas such as 302 comprising a series of molded ridges such as 302*a* and a molded riser such as 302*b* with a central truncated cone such as 302*c* centrally situated on the upper face of the riser 302*b*. At the bottom of the hemisphere a bottom support area 304 may be formed approximately circular in dimension with a central circular recess 304*a* molded into it. One of the coils 200 (FIG. 2) may mount into each of the five support areas such as 302 and into the bottom support area 304. Thus, the hemispherical shell 300 may contain, for example, six of the coils 200 (FIG. 2). Other embodiments may have shells of different shapes, such as elliptical, rectangular-box like, teardrop, or other shapes so as to adapt to a particular locator body configuration and/or style.

Figure 4:
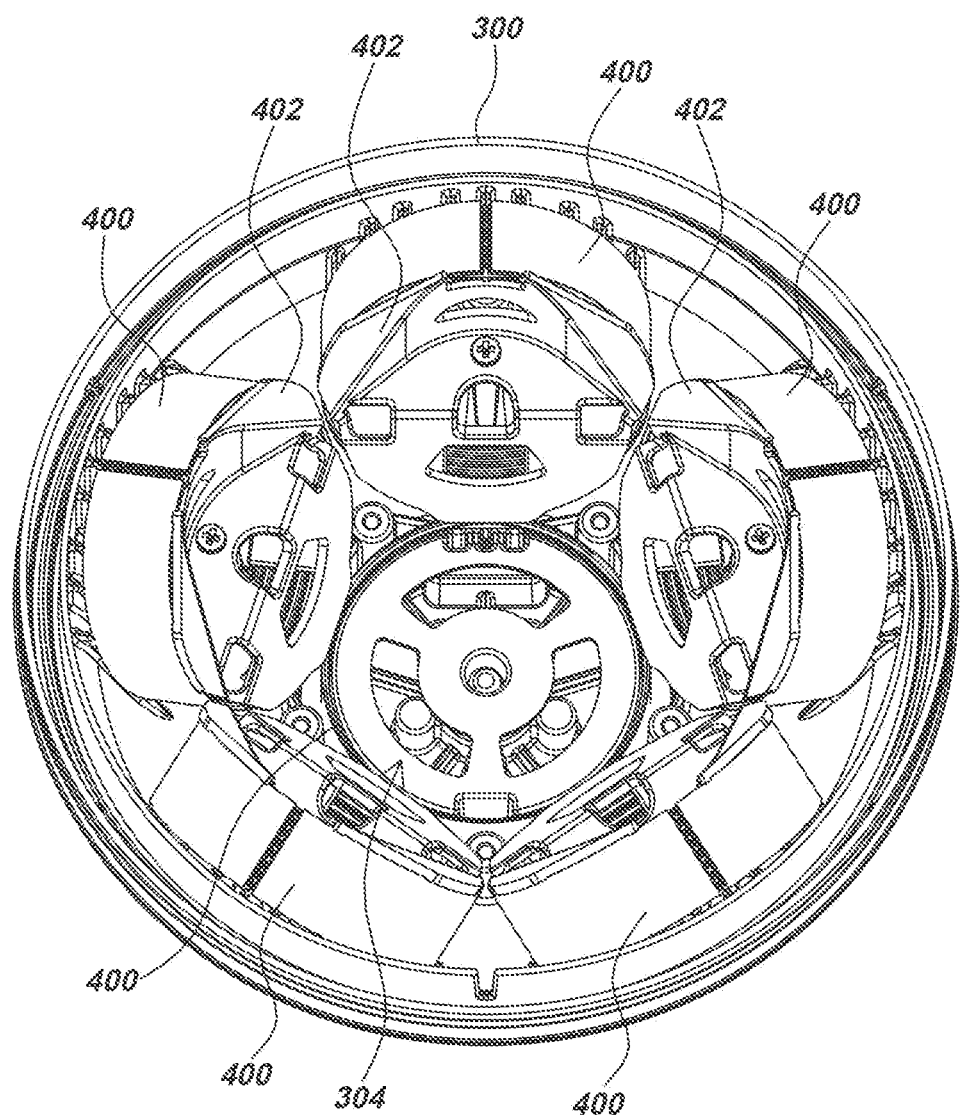
FIG. 4 illustrates details of the lower casing of the antenna array housing embodiment with six mounted coils in place.

FIG. 4 illustrates six coils 400 which may be mounted in the lower hemispherical shell 300 (FIG. 3). Each of the five side coils 400 may be seated on a molded plastic capture ring 402 which may snap-fit to the molded riser 302*b* (FIG. 3) in each support area such as 302 (FIG. 3). The bottom coil 400 may be mounted around the bottom support area 304 (FIG. 3).

Figure 5:
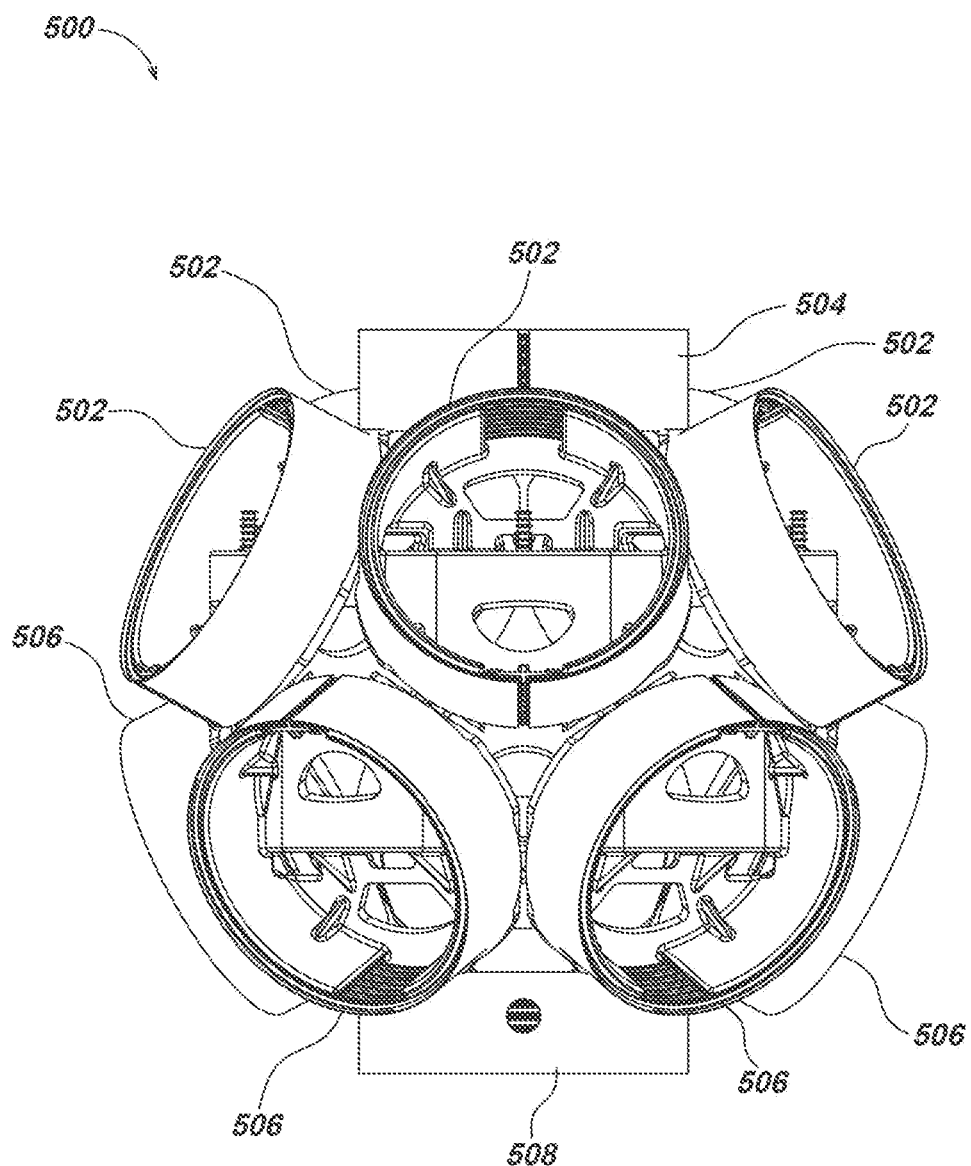
FIG. 5 illustrates the relative disposition of twelve coils in a dodecahedral array.
Figure 6:
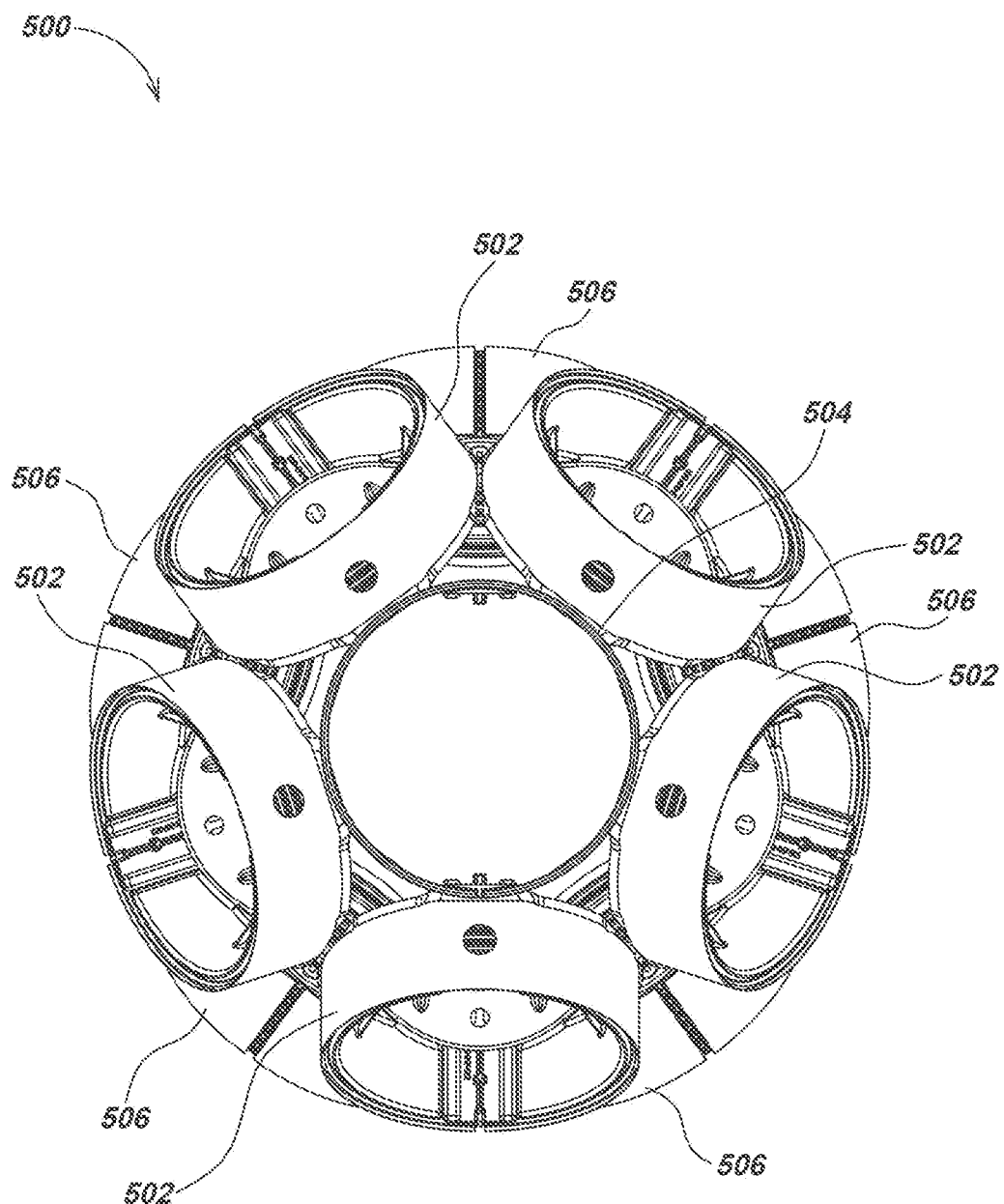
FIG. 6 is a top view of the dodecahedral array of FIG. 5.

Referring to FIGS. 5 and 6, details of an exemplary embodiment of a dodecahedral antenna node 500 containing twelve instances of an antenna coil, which may antenna coil 200 (FIG. 2), is illustrated. The lower shell 106 (FIG. 1) and the upper shell 108 (FIG. 1) are removed in FIG. 5 and FIG. 6 for purposes of illustration. The upper half of the dodecahedral antenna node 500 may contain, for example, five upper antenna coils 502 equally distributed around the vertical axis of the dodecahedral antenna node 500 and one top antenna coil 504. The lower half of the dodecahedral antenna node 500 may contain, for example, five lower antenna coils 506 equally distributed around the vertical axis of the dodecahedral antenna node 500 and one bottom antenna coil 508.

One potential advantage of a configuration such as shown in this embodiment is improved accuracy in the location of a dipole sonde, which may be used, for example, in locating the position of a pipe blockage. While it is possible to measure the magnetic field vector B with three orthogonal coils, more coils used together may provide a more accurate average value of #because of increased field flux measurements. The gradient of the field magnitude may also be computed from the fields measured at multiple coils, which can be used, for example, to locate the sonde regardless of orientation or position. In the exemplary dodecahedral antenna array of the present disclosure, three coils meet at each of twenty vertices of the dodecahedron. For each vertex, the strength of field may be solved using a linear system of three equations in which each coil has an orientation vector $\vec{a}$ and a voltage v.

$$v_1 = B_x a_{1x} + B_y a_{1y} + B_z a_{1z}$$

$$v_2 = B_x a_{2x} + B_y a_{2y} + B_z a_{2z}$$

$$v_3 = B_x a_{3x} + B_y a_{3y} + B_z a_{3z}$$

For the center of the dodecahedron, the field value may correspond to the average of the vertex vectors found for all twenty vertices of the dodecahedron.

At each point in space, the magnitude of the magnetic field $|\vec{B}|$ may be calculated by:

$$|\vec{B}| = \sqrt{B_x^2 + B_y^2 + B_z^2}$$

Each vertex also has a coordinate vector $\vec{b}$. A dodecahedron, as in this example, has twenty vertices. Multiplying the coordinate vector by the strength of the field at the vertex yields a vector that is a component of $\vec{\nabla}|\vec{B}|$, the gradient of the magnetic field magnitude. Summing all twenty of these components recovers $\vec{\nabla}|\vec{B}|$. The equation describing this process to find $\vec{\nabla}|\vec{B}|$ is:

$$\vec{\nabla}|\vec{B}| = \sum_{i=1}^{20} \vec{b}_i |\vec{B}|_i$$

The distance to the center of the dipole field from the center of the dodecahedron array may be found using:

$$\frac{|\vec{B}|}{|\vec{\nabla}|\vec{B}||} = r_{f(\lambda)}.$$

It can be seen in this example that the two vectors $\vec{\nabla}|\vec{B}|$ and $\vec{B}$ will be in the same plane as $\vec{m}$. For a dipole field, $\vec{B}$ can be calculated from:

$$B(m, r, \lambda) = \frac{\mu_0}{4\pi} \frac{m}{r^3} \sqrt{1 + 3\sin^2 \lambda}$$

where:
B (m, r, λ) is the strength of the field,
r is the distance from the center,
λ is the magnetic latitude measured in degrees from the dipole axis,
m is the magnetic moment, and
$\mu_0$ is the permeability of free space.
F(λ) is a known function of the magnetic latitude. The magnetic latitude may be calculated once the angle between $\vec{\nabla}|\vec{B}|$ and $\vec{B}$ are known. Once the magnetic latitude and the distance to the center of the sonde are known, the sonde is located. Because the field strength $\vec{B}$ is known and the sonde is located, the magnetic moment m may be calculated.

Based on these formulations, the dipole location problem may be solved, for example, by measuring the vectors $\vec{\nabla}|\vec{B}|$ and $\vec{B}$ using the voltage measurements at the twenty vertices of the coils in the dodecahedral configuration.

A similar series of calculations may be used in line tracing a buried conductor such as a pipe or cable. The distance to the conductor may be found because the quotient of the magnitudes of $\vec{\nabla}|\vec{B}|$ and $\vec{B}$ is:

$$r = \frac{|\vec{B}|}{|\vec{\nabla}|\vec{B}||}$$

The orientation of $\vec{I}$ (current in the conductor) may be directly found from the cross product of $\vec{\nabla}|\vec{B}|$ and $\vec{B}$. The magnitude of $\vec{I}$ may be found from:

$$I = \frac{2\pi r}{\mu_0} B$$

Figure 7:
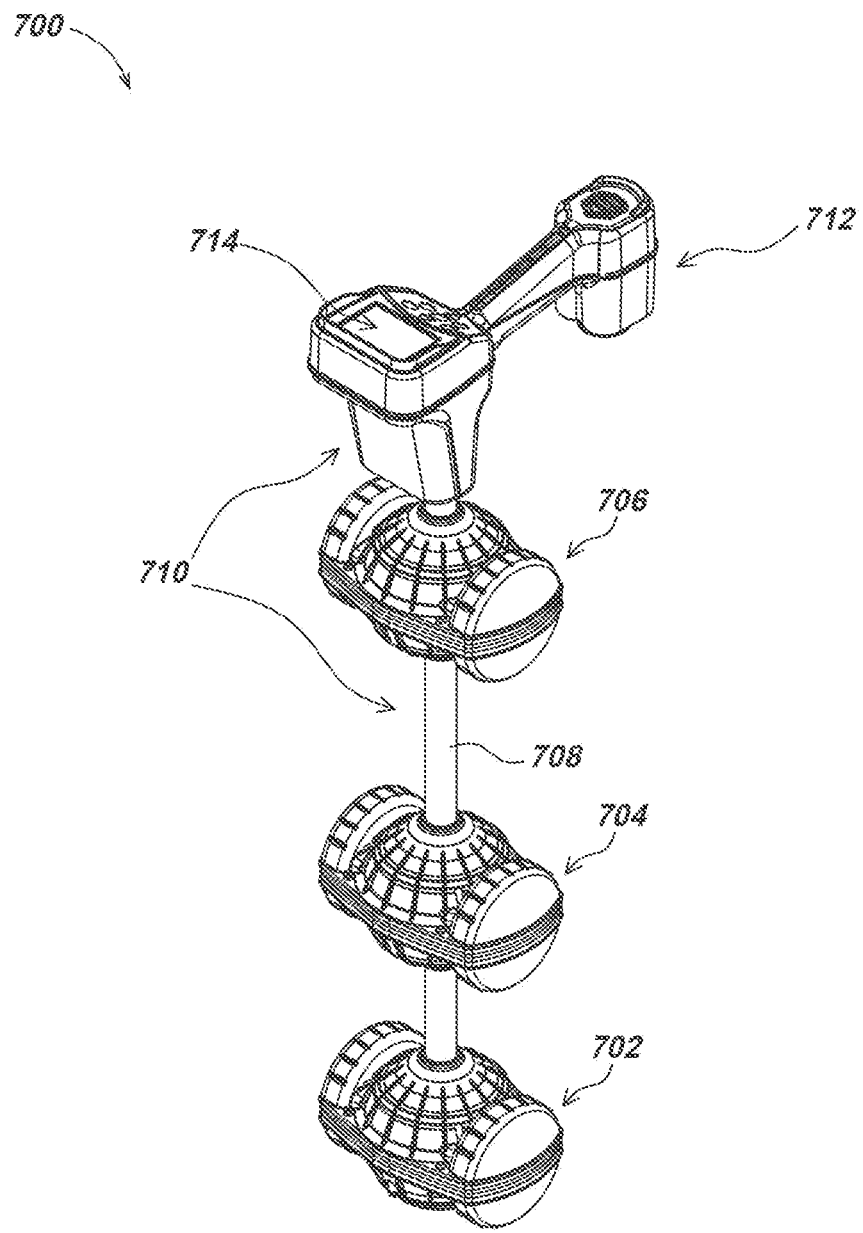
FIG. 7 illustrates an embodiment of a utility locator with three separate antenna nodes.

Referring to FIG. 7, an example embodiment of a utility locator 700 is illustrated. Locator 700 may include a body 710 which may be configured differently in various locator types. For example, in locator 700, the body 710 includes a head or top unit 712, and a central mast 708, along with associated mechanical component, such as hardware, connectors, etc. The head unit 712 may contain analog and/or digital electronic circuitry to receive and processing signals from antennas and other inputs, such as audio inputs, camera signals, and the like. Head unit 712 may include display and/or user interface components, such as one or more visual displays 714, speakers and/or headphone interfaces (not shown), switches, touchscreen elements, and the like. The electronic circuitry may include one or more processing elements or modules, that may be configured with one or more processors and memories to control various locator functions, such as those describes subsequently herein. In some embodiments, the head unit may include components such as cameras, distance measuring circuits (e.g., to determine distances to the ground or other surfaces), light control circuits, and/or other elements. Although locator 700 illustrates an example locator configuration based on locators provided by the assignee of the instant application, other locator configurations may also include the various teachings herein in various embodiments. For example, other embodiments of locators having different body configurations are shown and further described with respect to FIG. 32 and FIG. 33.

Figure 32:
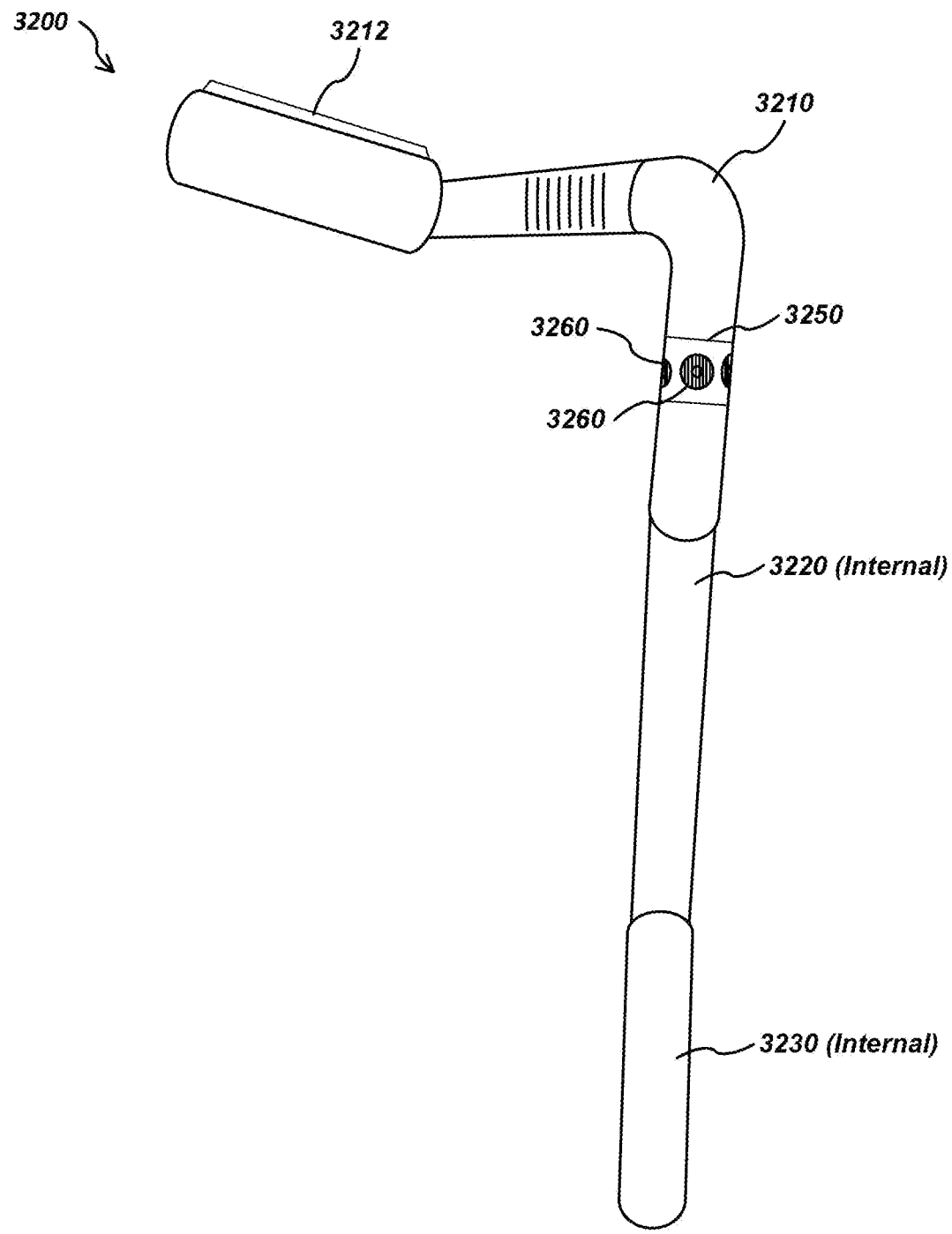
FIG. 32 illustrates details of another locator configuration including a safety lighting apparatus on or integral with the locator body.
Figure 33:
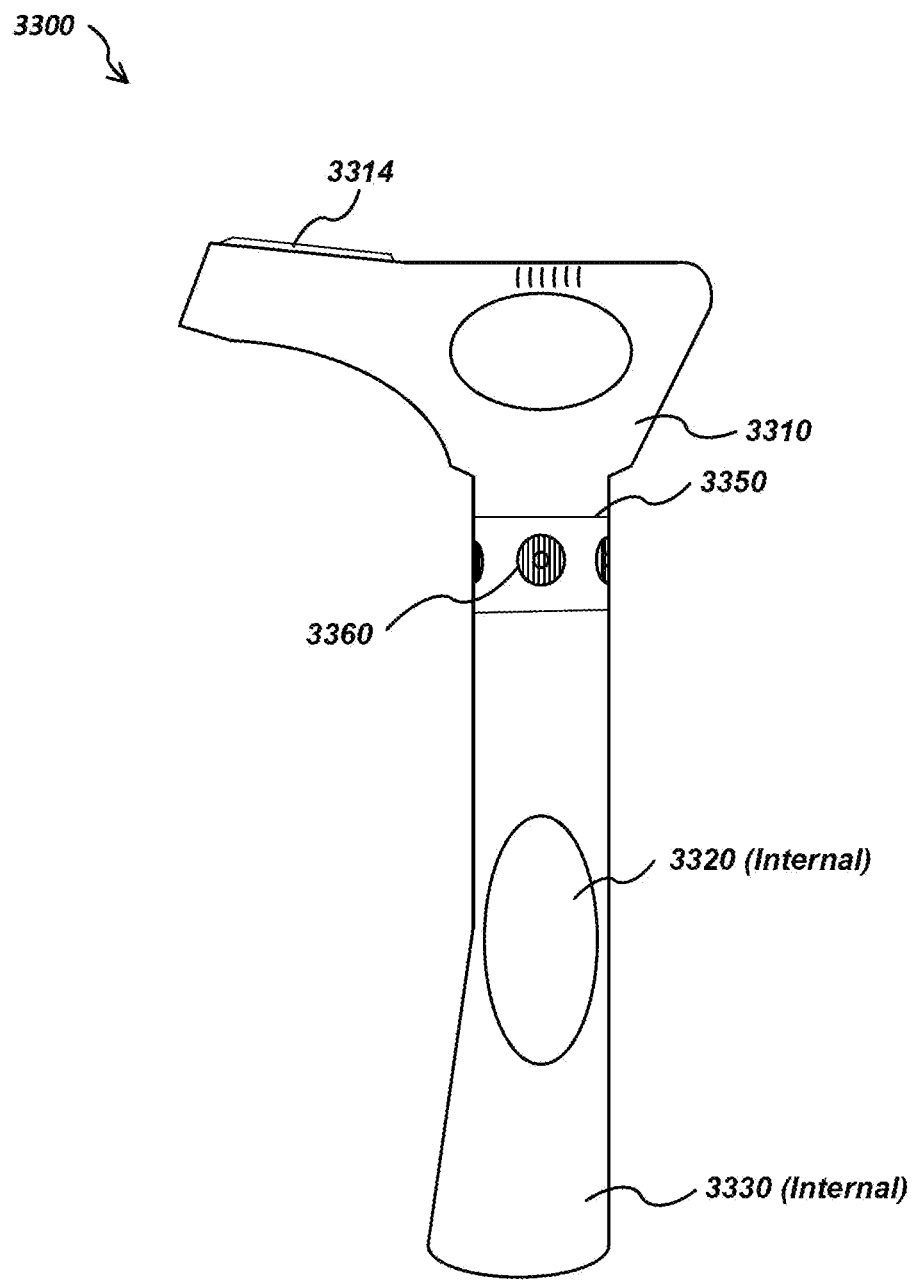
FIG. 33 illustrates details of another locator configuration including a safety lighting apparatus on or integral with the locator body.

Locator 700 may include one or more antenna modules or nodes, such as a lower antenna node 702, a middle antenna node 704, and an upper antenna node 706 as shown. The antenna nodes 702, 704, and 706 may be of the same or similar forms, and may be molded to be coupled around a central locator mast 708 (or disposed on or within the locator body in configurations such as shown in FIG. 32 and FIG. 33). In FIG. 7, each antenna node may include an antenna configuration of six coils 200 (FIG. 2) as will be described in further detail. Alternatively, in other embodiments, one or more nodes may be used for other kinds of antennas, sensors, and/or circuitry.

Figure 8:
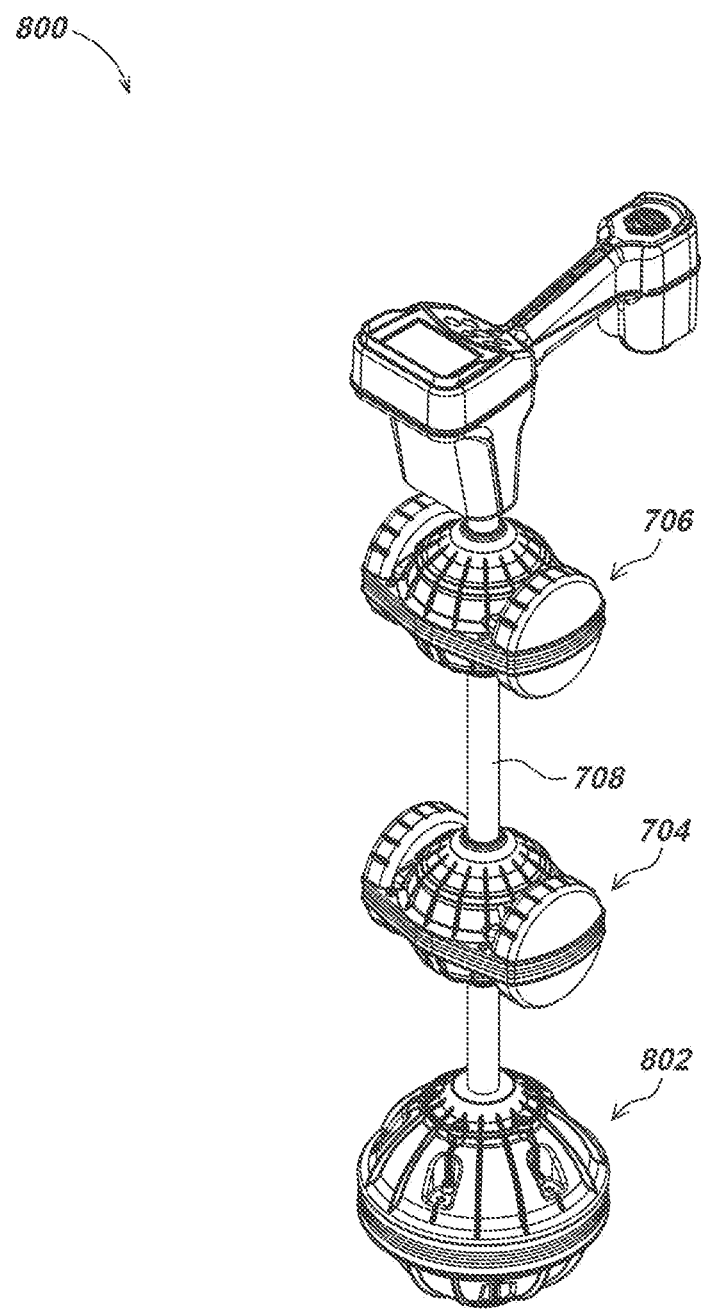
FIG. 8 illustrates an embodiment of a utility locator configured with an upper GPS node, a center six-coil node and a lower dodecahedral antenna node.

Referring now to FIG. 8, in an alternative embodiment, a utility locator 800 may be constructed similarly to locator 700 of FIG. 7, with the lower node 702 of FIG. 7 replaced with a dodecahedral node 802, as described previously with respect to FIGS. 1 through 6.

Figure 9:
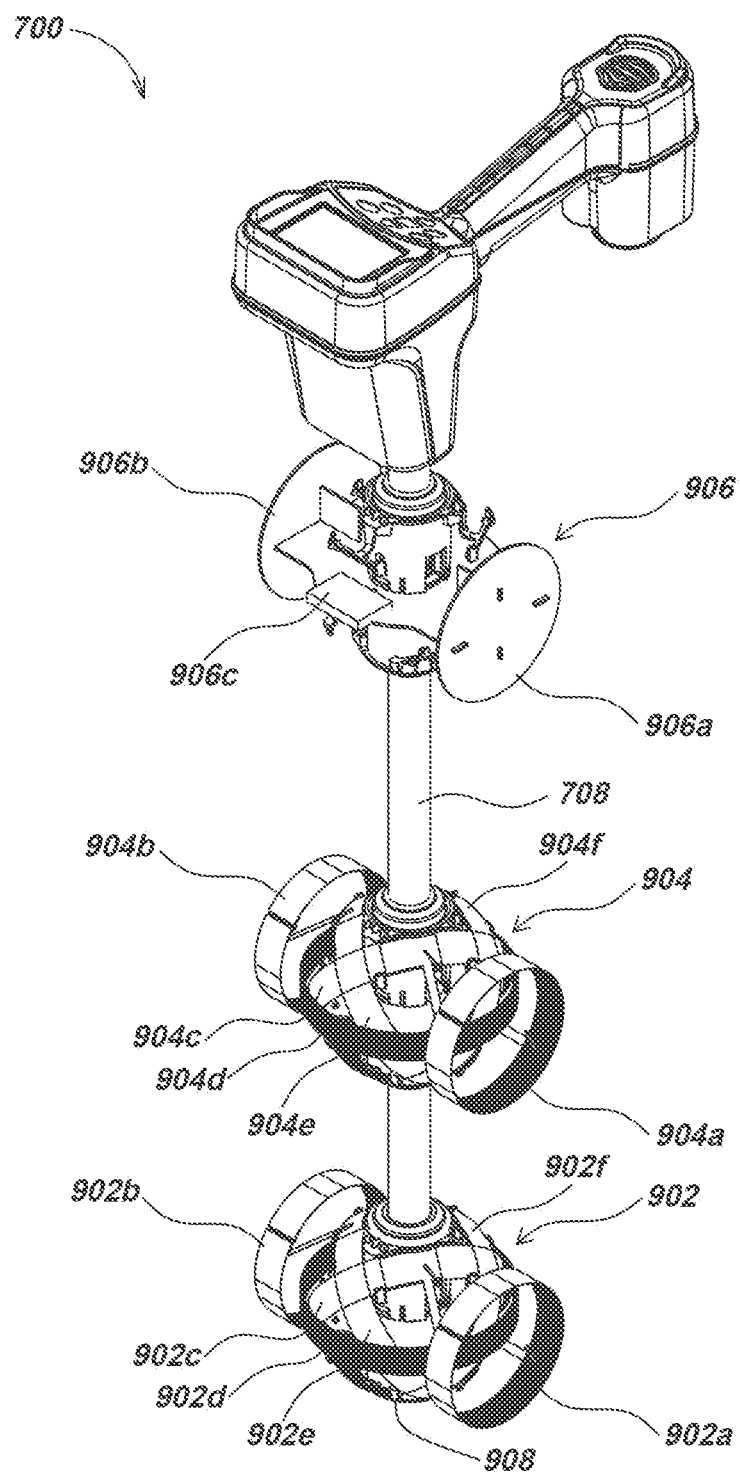
FIG. 9 illustrates the disposition of coils and additional antennas in the utility locator embodiment of FIG. 7.

Turning to FIG. 9, additional details of utility locator embodiment 700 (FIG. 7) are illustrated, with the outer casings of the several antenna nodes removed for purposes of illustration. A lower antenna array 902 may comprise, for example, six antenna coils such as illustrated in FIG. 2. A lower left gradient antenna 902a and a lower right gradient antenna 902b may be oriented diametrically aligned with the locator mast 708. Four of the antenna coils 902c, 902d, 902e and 902f may be arranged orthogonally within the spherical shell 702 (FIG. 7) of the lower antenna node 902.

A middle antenna array 904 may be disposed a fixed distance above the lower antenna array 902. In the middle antenna array 904 a middle left gradient antenna 904a and a middle right gradient antenna 904b may be oriented diametrically aligned with the locator mast 708. Four of the antenna coils 904c, 904d, 904e and 904f may be arranged orthogonally within the spherical shell 704 (FIG. 7) of the middle antenna node 904. An upper antenna array 906 as illustrated in FIG. 9, for example, may include a left upper circuit board 906a, a right upper circuit board 906b, and a central upper circuit board 906c. The circuit boards may be connected within the spherical shell of the upper antenna node 706 (FIG. 7). The left upper circuit board 906a and the right upper circuit board 906b may optionally be used to mount a pair of industrial, scientific and medical band (ISM) antennas, for example, enabling the locator 700 to communicate with other devices such as appropriately-equipped transmitters or locational beacons, for example. The central upper circuit board 906c may serve as a mounting surface for sensors such as dual GPS sensors, for example.

At the bottom of the lower antenna array 902 an adaptor port 908 may be electrically connected to the locator 700 to support the attachment of auxiliary devices used in specialized locating situations, such as fault-finding in a buried conductor, for example. Other devices may be similarly attached as required by a particular application.

Figure 10:
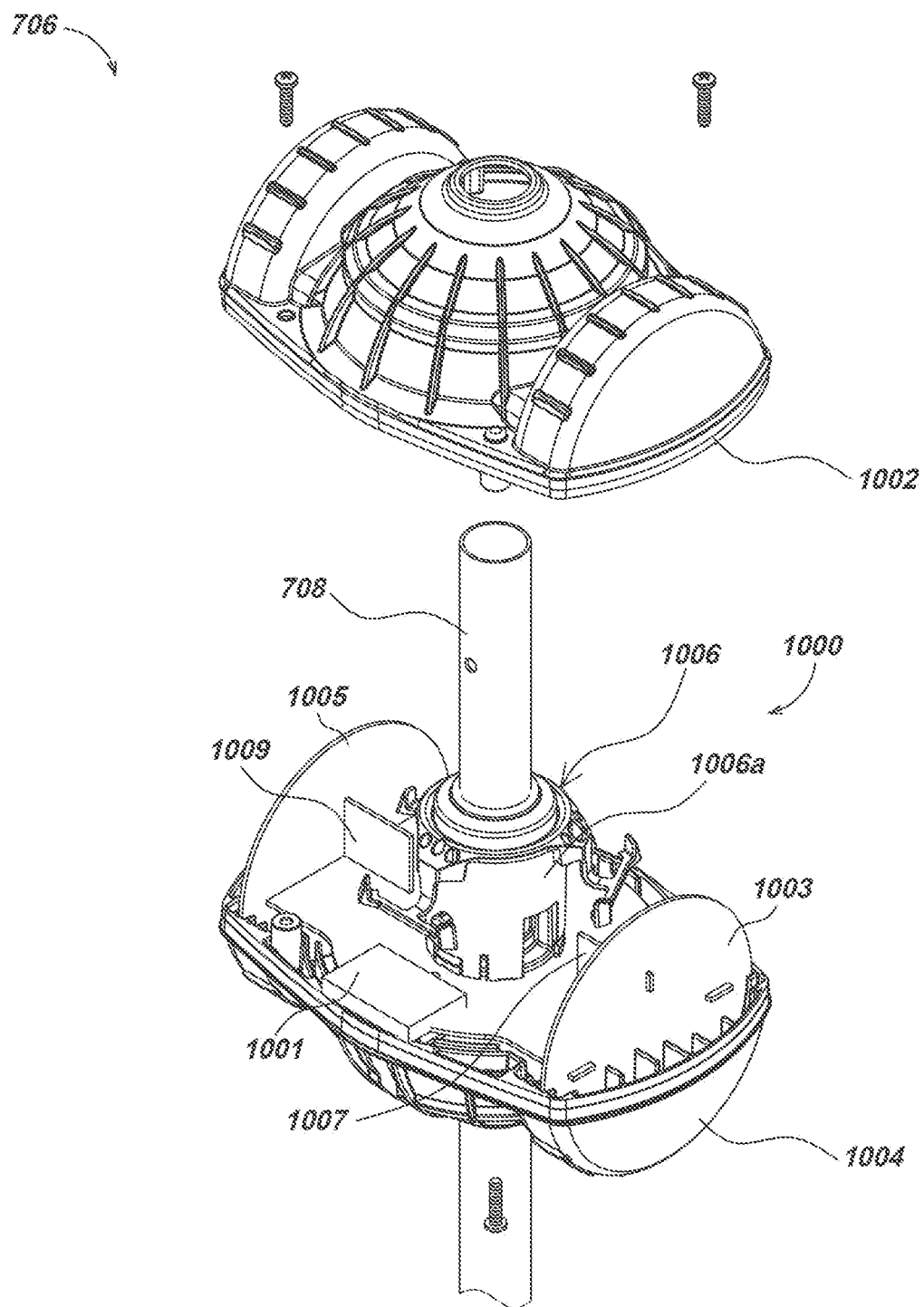
FIG. 10 is a partially exploded view illustrating the interior construction of an embodiment of a GPS antenna node.
Figure 11:
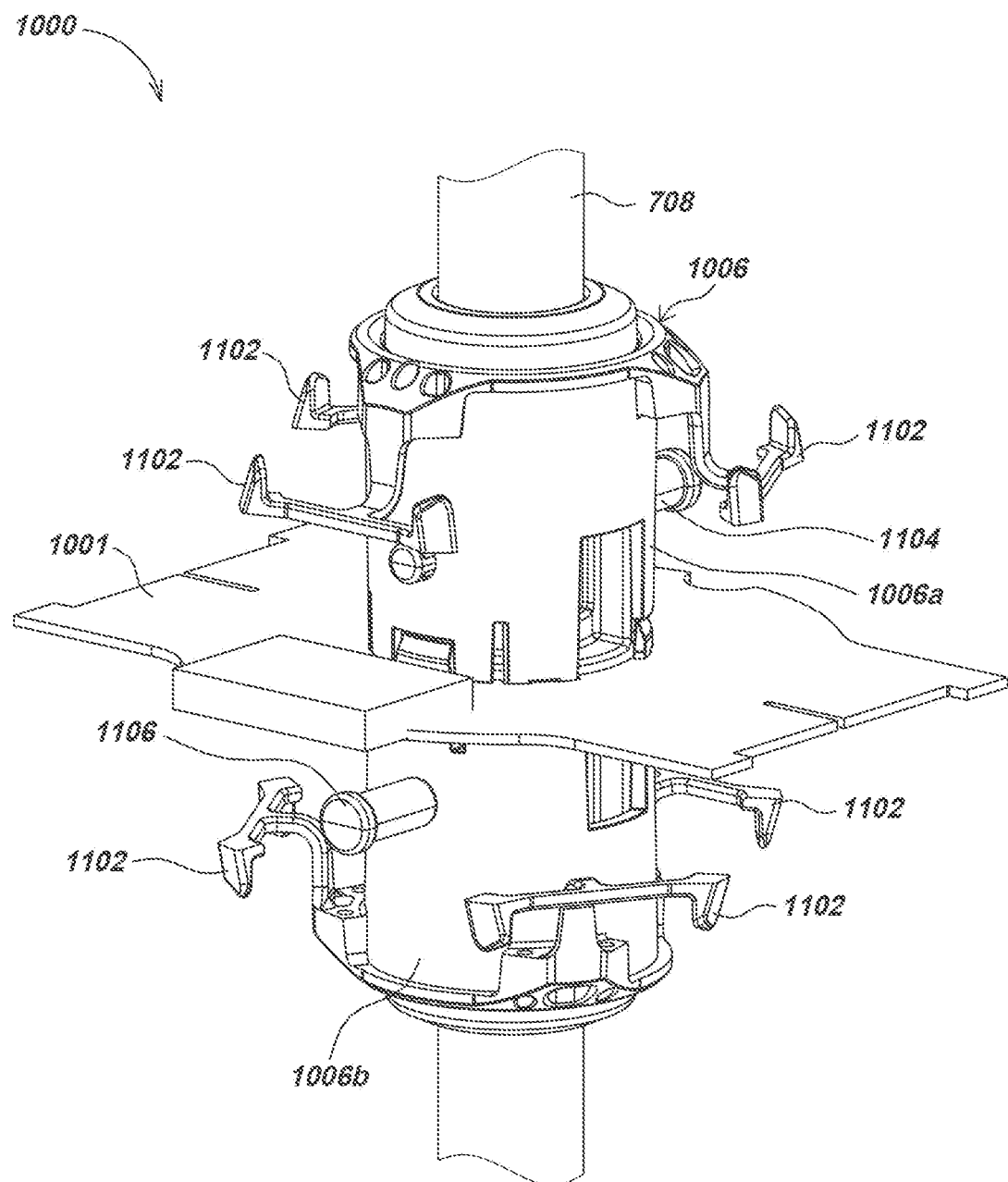
FIG. 11 illustrates details of an embodiment of an antenna node mounting system.
Figure 12:
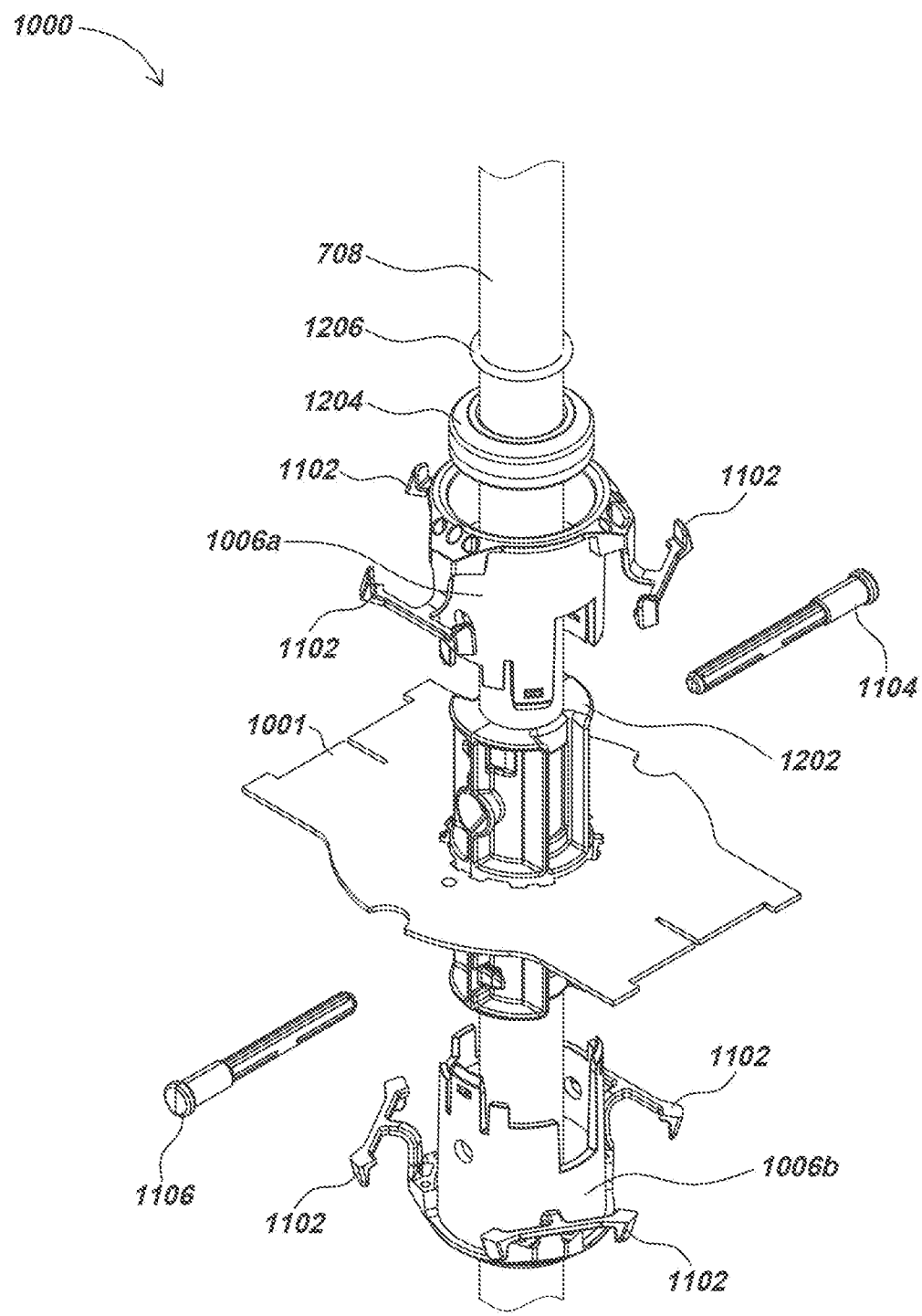
FIG. 12 illustrates additional details of the antenna node mounting system embodiment of FIG. 11.

Referring to FIGS. 10, 11 and 12, details of an example configuration of the antenna nodes is further illustrated. The lower antenna node 702, middle antenna node 704 and upper antenna node 706 (FIG. 7) of this embodiment may be mounted to the locator mast 708 with the same or similar mounting mechanisms, and may be protected by and contained in identical shell casings or housings. The casings may comprise two mating casings, such as upper mating casing 1002 and lower mating casing 1004, for example. FIGS. 10, 11 and 12 illustrate upper node 706 (FIG. 7) and an exemplary mounting mechanism 1000 shown by the removal of the upper mating casing 1002.

The lower mating casing 1004 may be fitted to a centering assembly 1006 which may consist of an upper triad centering post 1006a and a lower triad centering post 1006b. The upper triad centering post 1006a and the lower triad centering post 1006b (FIG. 11) may be identical in form for ease in manufacturing. The upper triad centering post 1006a and the lower triad centering post 1006b may each be molded with a plurality of projecting antenna support arms 1102, for example. The upper triad centering post 1006a may be supported by an upper pin 1104 which may be inserted through a hole in its surface and a matching hole in the mast 708, and the lower triad centering post 1006b may be supported by a lower pin 1106 which may be inserted through a hole in its surface and a matching hole in the mast 708. A circuit board 1001 may be latched to the mounting by tabs inserted in slots, and may support the antenna coils at some points.

Referring to FIG. 11 the upper node 706 (FIG. 7) may include one or more circuit boards for housing electronic components, such as an elongated circuit board 1001 as shown. The lower nodes (702 and 704 in FIG. 7) may use a more nearly circular form of circuit board (such as, for example, PCB 1308 as illustrated in FIG. 13).

In FIG. 12, the upper triad centering post 1006a and the lower triad centering post 1006b have been moved aside to illustrate an exemplary attachment mechanism. A bushing adaptor 1202 formed of two identical mating halves fitted to the mast 708 may be vertically supported by the upper pin 1104 and the lower pin 1106. The bushing adapter 1202 may be fitted at its top to a formed ring-shaped stop 1204 fitted with an upper O-ring 1206 sealing its connection to the mast 708. An identical stop with O-ring, not shown here, may seal the bottom of the bushing adaptor 1202 at its connection to the mast 708.

Figure 13:
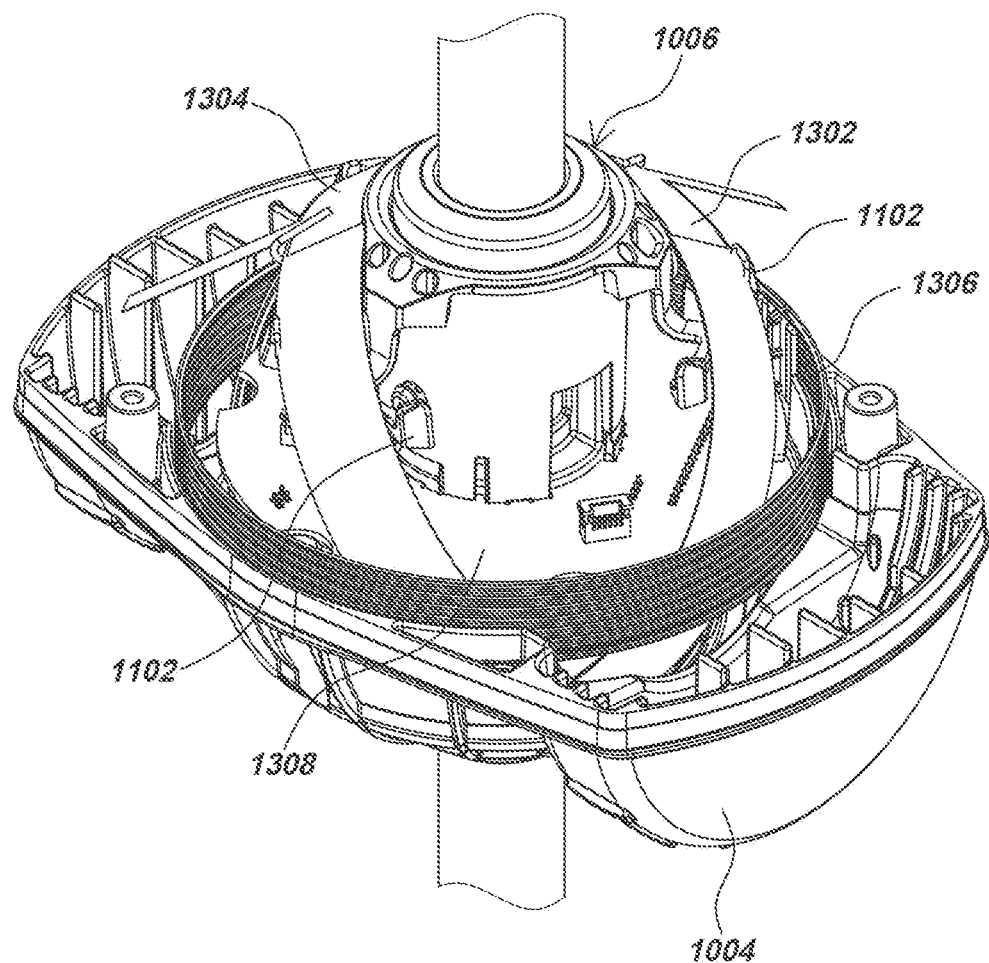
FIG. 13 illustrates details of an embodiment of a partially assembled antenna node configured with three of the coils.

Referring to FIG. 13, the use of the centering assembly 1006 (FIG. 10) and the antenna support arms 1102 (FIG. 11) may be seen in a partially assembled node in which an exemplary outer antenna coil 1302 and an inner antenna coil 1304 may be mounted using antenna support arms 1102 (FIG. 11). An equator antenna coil 1306 may be supported by the molded form of the lower casing 1004 and may be seated around an interconnect PCB 1308 which may support the electrical circuitry connecting the antenna node to the locator.

Figure 14:
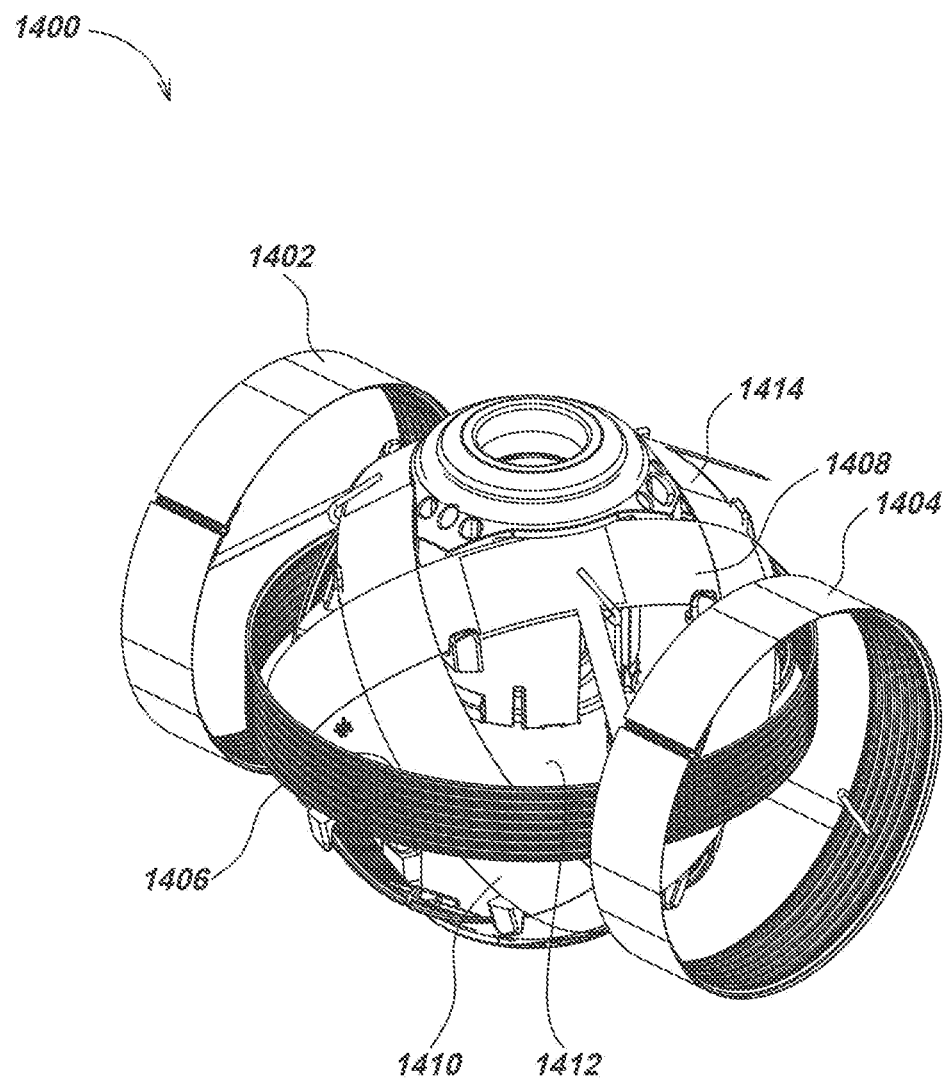
FIG. 14 is an embodiment of a six-coil antenna node with the outer shells removed.

Referring to FIG. 14, an example of the configuration of one embodiment of a locator lower antenna array 902 (FIG. 9) in a lower antenna node 702 (FIG. 7), and of a middle antenna array 904 (FIG. 9) in a middle antenna node 704 (FIG. 7) is illustrated. Antenna array 1400 may consist of six instances, for example, of a coil such as the deformable coil 200 as illustrated in FIG. 2. A left gradient coil 1402 and a right gradient coil 1404 may be seated in formed sides of the lower mating casing 1004 (FIG. 10). An equator coil 1406 may be retained by the molded form of the lower mating casing 1004 (FIG. 10) and may be seated concentric with the locator mast 708 (FIG. 7). An outer coil 1408 and an inner coil 1410 and a rear coil 1414 may be seated within the equator coil 1406 such that they are orthogonal. A node PCB 1412 may serve as an interconnect from each antenna band and may support signal-processing circuitry for the node. Left gradient coil 1402 and right gradient coil 1404 may be connected to separate channels or connected differentially to a single channel.

In one aspect of the present disclosure, the gradient pair comprising left gradient coil 1402 and right gradient coil 1404 may be wired differentially to minimize mutual inductance. In another aspect, the gradient antenna centroids may each be disposed within one gradient antenna diameter of the orthogonal centroid. In another aspect, the gradient antenna centroids may each be disposed within one orthogonal antenna diameter of the orthogonal centroid.

In an alternate embodiment, a diversity receiving antenna pair such as, for example, a pair of Instrumentation, Scientific, and Measurement (ISM) radio antennas and/or receiver/transmitter modules, for example, may be placed within the gradient coils or within each gradient coil. In one aspect of the present disclosure, one such antenna may be a GPS receiving antenna. In other embodiments, ISM radio antennas, modules, GPS antennas, and GPS sensor modules (e.g., receivers and signal processing circuits) may be disposed on or within a locator body.

Figure 15:
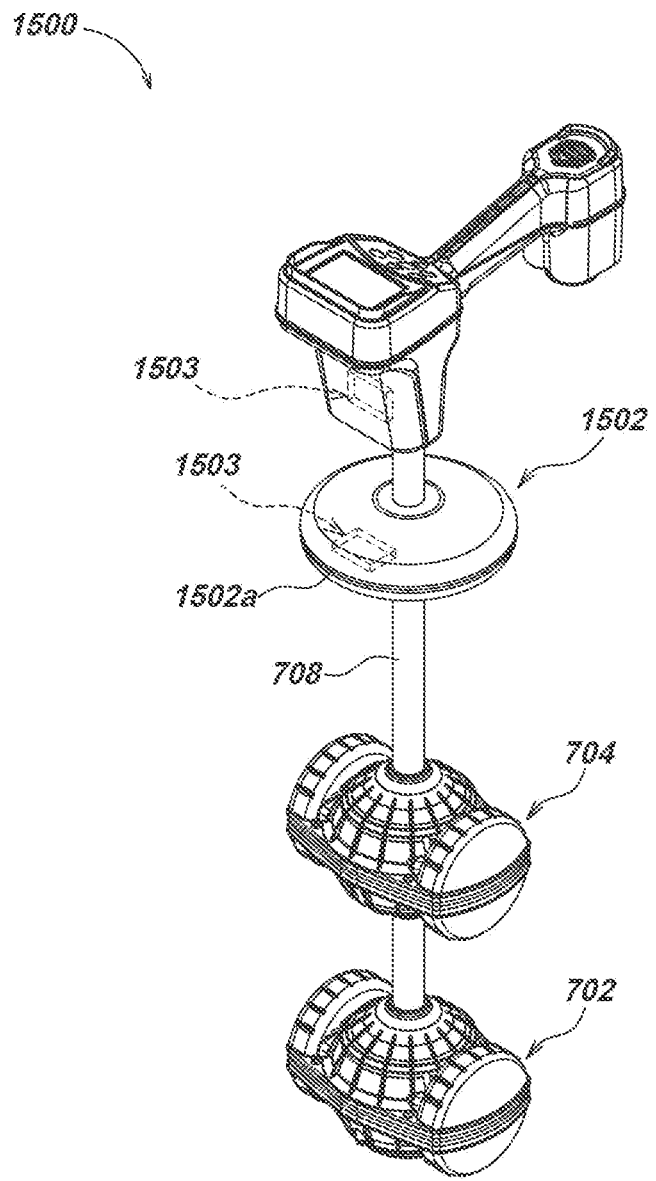
FIG. 15 is a perspective view of an embodiment of a utility locator configured with a GPS antenna.
Figure 16:
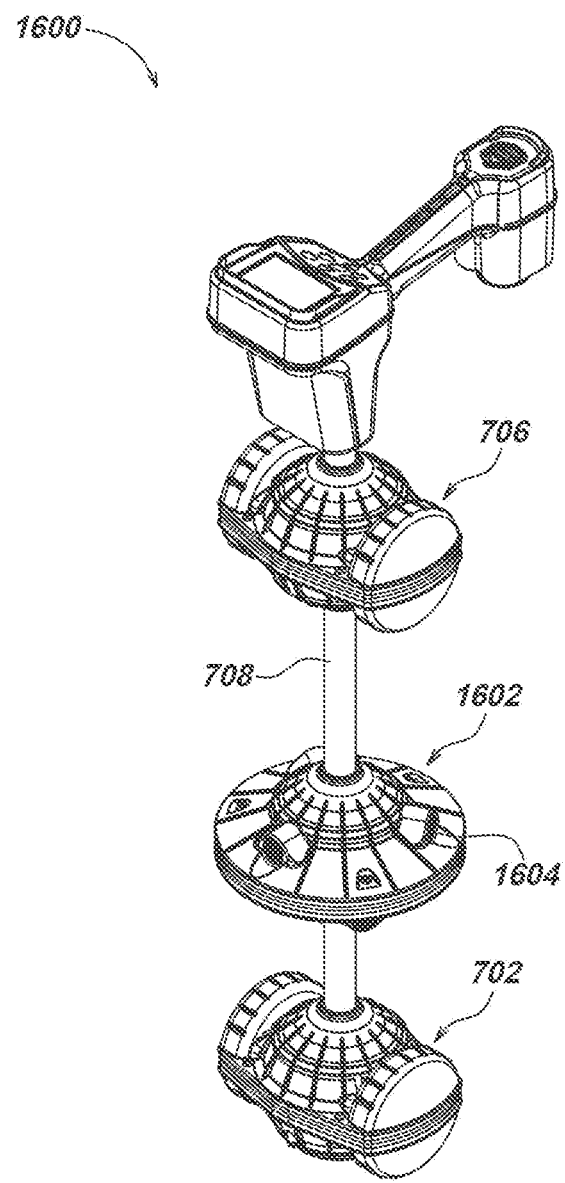
FIG. 16 is a perspective view of an embodiment of a utility locator configured with a central antenna node including a GPS antenna module.
Figure 17:
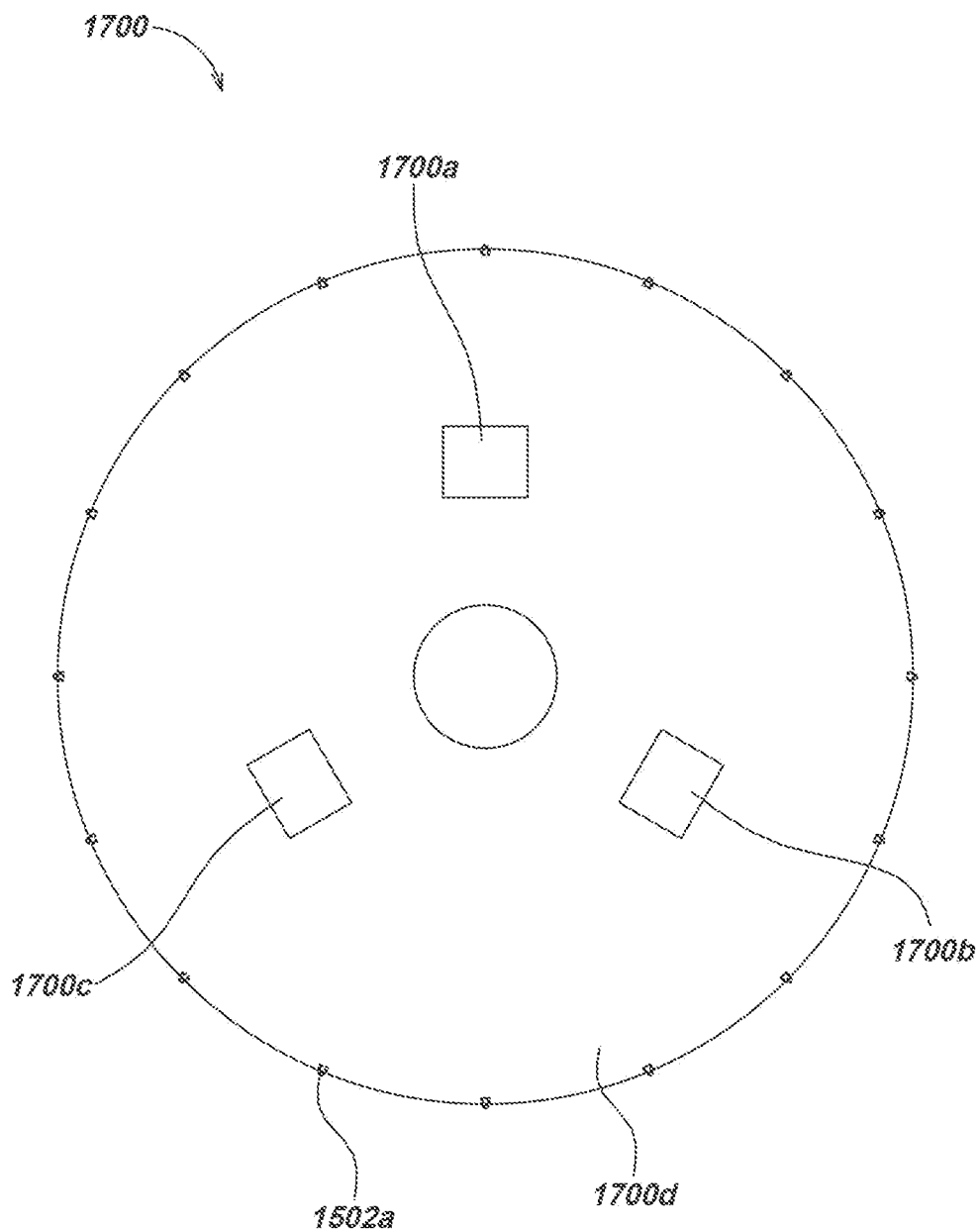
FIG. 17 illustrates details of an embodiment of a GPS antenna module configured with three patch antenna units.

Referring to FIGS. 15, 16, and 17, an alternate embodiment of the present invention illustrates a locator embodiment 1500 in which one antenna module 1502 may include a GPS antenna array, and/or other antenna or processing elements. These may be housed in a housing element such as the disk-shaped casing as shown, or in another housing configuration. The lower module 702 and middle module 704 may be as described in FIG. 7 and/or may be dodecahedral antenna nodes such as described previously herein. It may be advantageous to locate the GPS antennas above the antenna nodes 704 and 702, but below the head unit (as shown).

The housing of antenna module 1502 may include a safety lighting assembly, such as in the form of an array of LEDs or other lighting elements, which may be configured to provide directional light output, such as in a substantially planar direction (orthogonal to the mast of the locator), and/or which may include predefined controlled flashing output light sequences.

As used herein, a substantially planar light output refers to a light output that has most of its energy contained in a beam or series of beams that are in a targeted plane. Due to constraints such as limitations on costs of components, such as optics, LED elements, and the like, it will typically be impractical to constrain all of the output light to the targeted plane and some will spread outward from the plane, however, in order to maximize efficiency, it is typically desirable that most of the light be planar. For example, in safety applications, it may be desirable that light be directed in a plane that is orthogonal to a locator body or mast when in use. The locator body will typically be oriented vertically relative to the ground when in use (as shown in FIG. 28C), and in order to provide visibility to vehicles or others approaching the operator, directing the output light substantially in a plane parallel to the ground, as shown in FIG. 28C, can be used to maximize efficiency by reducing wasted light directed upward or downward (e.g., most of the light is directed in the direction of oncoming vehicles so that the amplitude of this light can be maximized for a given available power. Since locators are typically operated with battery power, conservation of power through directing output light beams in planes as shown, and/or by using short duty cycle output light pulsing as described subsequently, can be advantageous in reducing power consumption and/or providing maximum light output and/or duration on a given amount of available battery power.

For example, as shown in FIG. 15, one embodiment of the safety lighting assembly may include an array of LEDs 1502*a* as a safety-alert measure, positioned around some or all of the circumference of module 1502 to provide omnidirectional coverage. By providing light in a planar, directional fashion using LEDs or equivalent lighting elements, high output light power may be provided, even during daylight, in a focused direction so as to warn oncoming vehicle drivers, etc., of the presence of a user operating the locator.

A typical buried object locator, such as locator 700, will operate on battery power, and thereby require efficient use of power to provide safety lighting. Power reduction may be addressed, for example, by providing a high output flashing light sequence from the safety lighting assembly, such that the flashes may be visible at a distance, even in daylight. The flashing may be controlled by a processing element, such as a processing element disposed in a head unit of a locator, along with a solid state switching circuit. Alternately, or in addition, a dedicated safety lighting circuit, which may include a processing element, memory, and associated analog or digital circuitry, ambient light sensors, and the like may be used to provide dedicated control of the operation of the safety lighting. This circuitry may be coupled to or included in the safety light assembly. Particular lighting colors, pulse patterns, duty cycles, amplitudes (e.g., adjustment of lighting output based on ambient lighting conditions, such as providing higher light output during bright daylight and reduced output at night or in lower light conditions), and the like may be controlled by a processing element and may be fixed or dynamically adjusted by an operator or based on environmental conditions such as location, ambient lighting, or other parameters.

FIG. 16 illustrates details of another embodiment 1600 of a locator, wherein the central antenna node 1602 may contain one or more GPS antennas or modules. The central antenna node 1602 may be fitted with a safety lighting assembly which may include multiple LED units 1604 seated in formed hoods or similar receptacles of the node housing. In one embodiment of this configuration, a GPS antenna array 1700 comprises three GPS patch antennas 1700*a*, 1700*b*, and 1700*c* for example, which may improve accuracy by providing multiple diverse receivers as well as heading information using GPS compass techniques. Patch antennas 1700*a*, 1700*b*, and 1700*c* may be mounted on a copper-clad laminate circuit board acting as a ground plane 1700*d*. Alternatively a single patch antenna may be used. The entire module may be optionally placed on the large ground plane 1700*d*.

Figure 18:
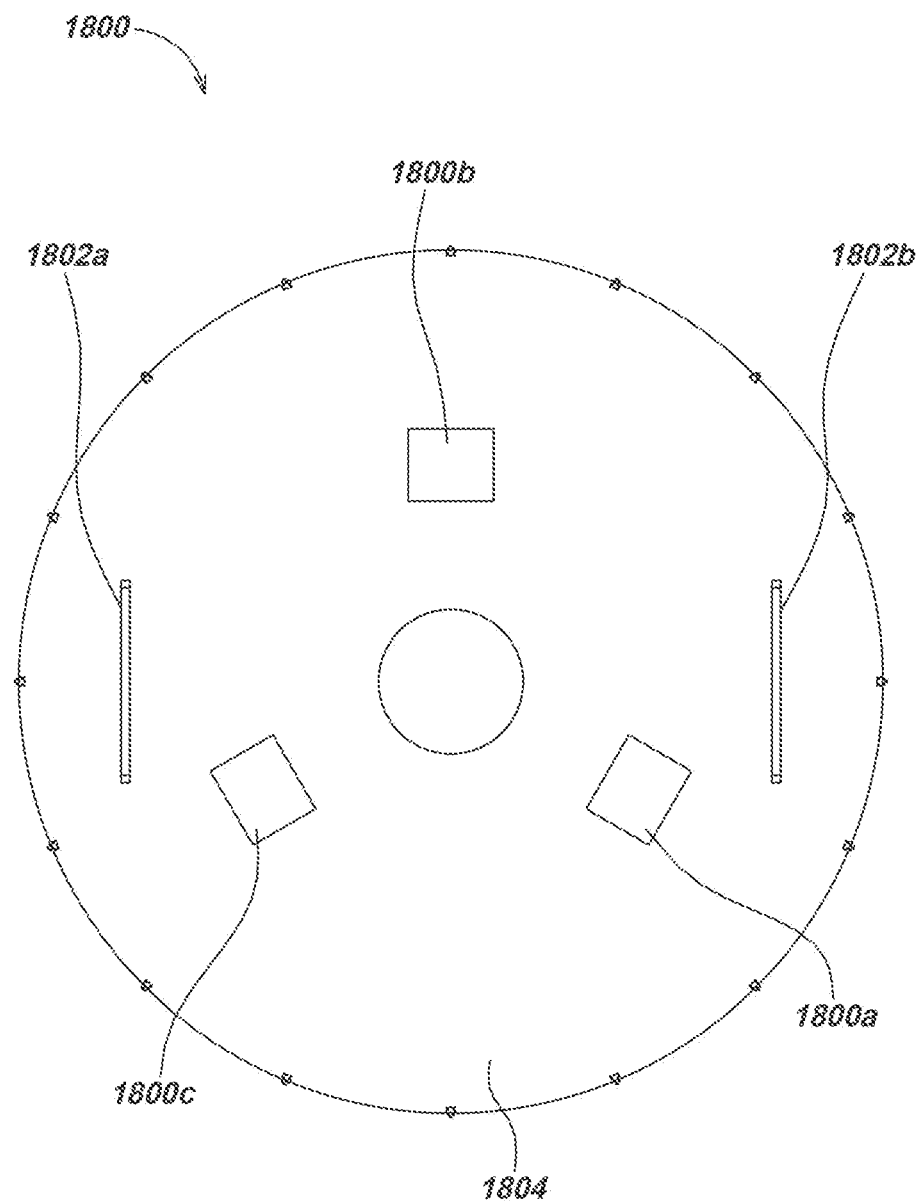
FIG. 18 illustrates details of the GPS antenna module embodiment of FIG. 15 configured with three patch antenna units and two ISM radio antenna units.

An alternate embodiment of details of a the GPS antenna array is illustrated in FIG. 18. A GPS antenna array 1800 may comprise, for example, a first GPS patch antenna 1800*a*, a second GPS patch antenna 1800*b*, and a third GPS patch antenna 1800*c* distributed around the inner region of the array. Two industrial, scientific and medical (ISM) radio band antennas 1802*a* and 1802*b* may be used in place of or in addition to the GPS antennas to provide diverse reception of ISM radio signals (operating around a center frequency of, for example, 915 MHz or 2.4 GHz) providing data exchange with other units such as beacons, locators, transmitters, or other devices or systems. Alternatively, a single patch antenna, or a pair, may be used depending on the intended application. A copper-clad laminate PCB may be used as a ground plane 1804.

Figure 19:
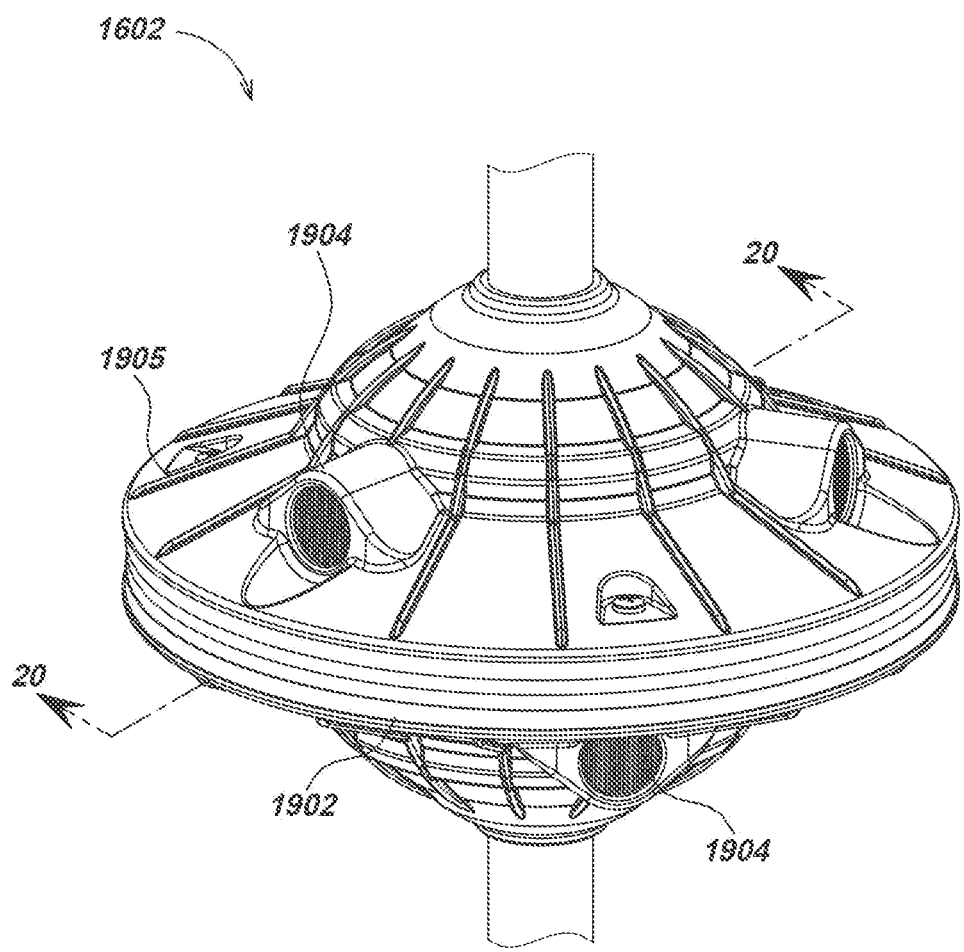
FIG. 19 is a perspective view of an embodiment of the central antenna node with recesses for holding TIR LEDs using beam-forming optics.
Figure 20:
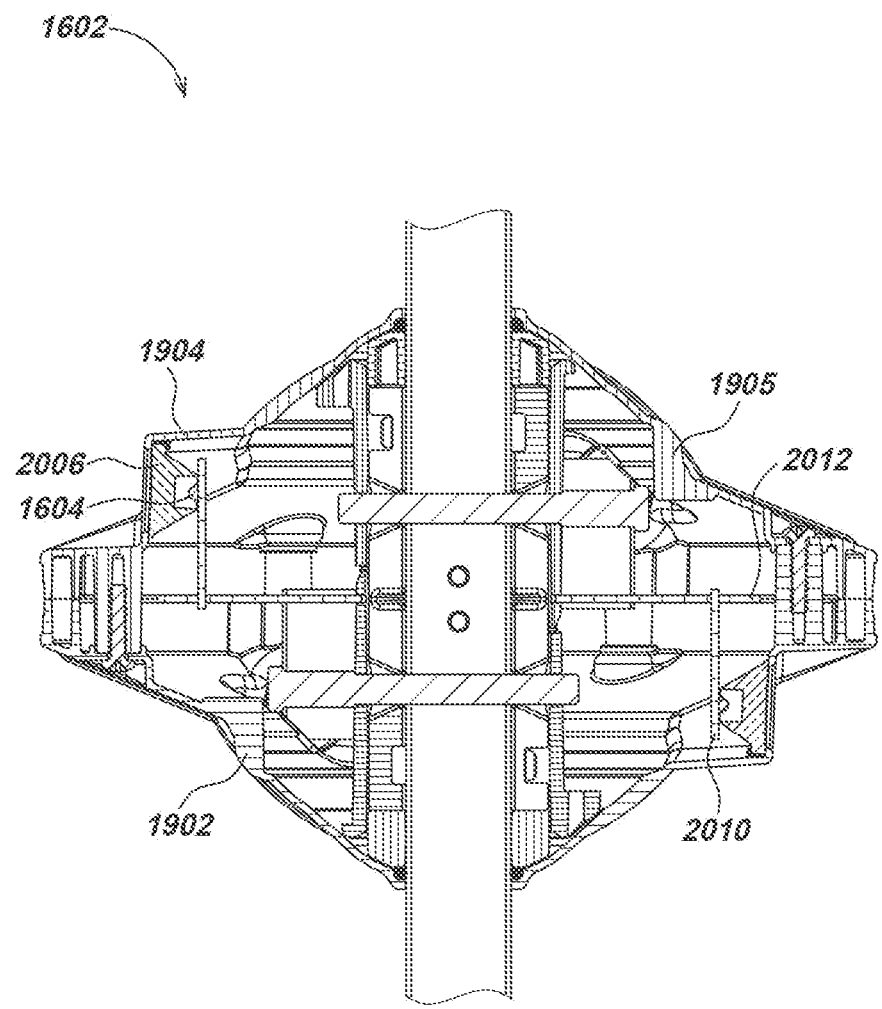
FIG. 20 is a section view of the central antenna node of FIGS. 16 and 19, taken along line 20-20 of FIG. 19.
Figure 21:
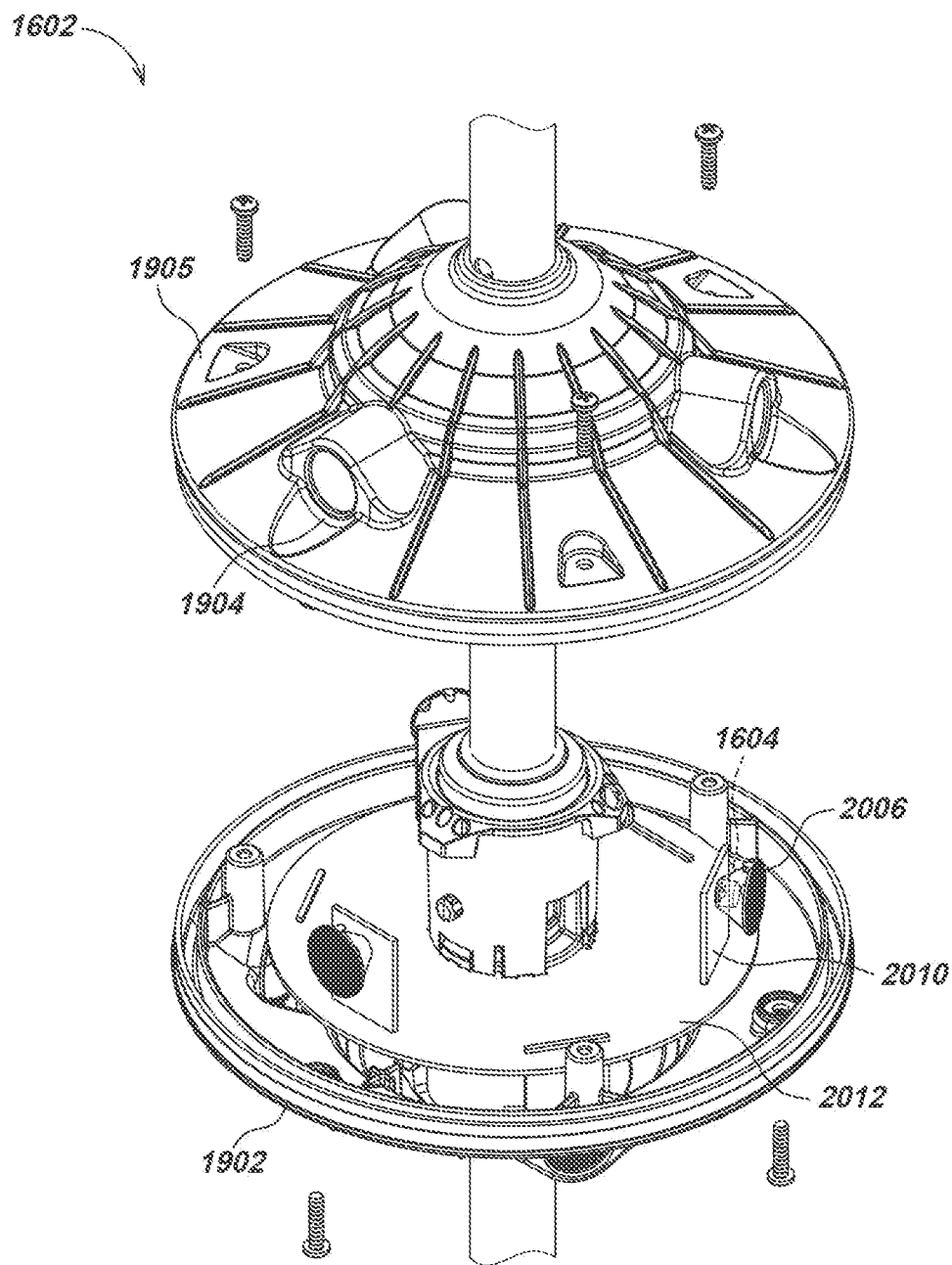
FIG. 21 is a partially exploded view of the central antenna node of FIGS. 16 and 19, illustrating LED units in receptacles molded into the shell.

Referring now to FIGS. 19, 20, and 21, additional details of node embodiment 1602 (FIG. 16), including an integral safety lighting assembly, are illustrated. The node's lower casing 1902 may incorporate three molded recesses such as 1904. A similar number of recesses may be molded into the mode's upper casing 1905. Into each such recess 1904 a "total internal reflector" (TIR) high-powered LED light unit 1604 (FIG. 16) of the safety light assembly may be inserted. The LED light unit may be advantageously configured to form an elliptical or "fan-shaped" output light beam pattern, which is a beam contained within approximately a planar surface orthogonal to a locator's mast or other upright or vertical element (relative to the ground when in use), such as shown in FIGS. 28C, 28D, and 28G. In an example embodiment, the LED light unit may be configured with an LED, reflector, and lens or other optic to provide a fan angle of approximately 60 degrees per LED. Other patterns may also be used in alternate embodiments.

To implement such a beam fan pattern, each LED light unit may include a reflector lens 2006, which may be sealed to the outer opening of the recess 1904 (FIG. 19), along with a directional lens or other optic (e.g., a lens with a vertical structure, a ball lens, refractor, cylindrical lens, or other collimator). In an exemplary embodiment, a Cree XP-E or XP-C TIR LED unit, available commercially from Carclo Technical Plastics 111 Buckingham Ave, Slough, Berkshire, SL1 4 PF, England, may be used. The use of this configuration with red LEDs, for example, creates two blended bands of red light emanating from the elliptical beams around the perimeter of the upper casing 1905 (FIG. 19) and the lower casing 1902 (FIG. 19) serving as a safety warning. In an alternative configuration six molded recesses containing LED units 1604 (FIG. 16) may be formed in only one of the upper or lower casings. The LEDs may be electrically connected to an LED unit PCB 2010 which may be electrically connected to a node PCB 2012 and a locator circuit and/or processing element. The LED units 1604 (FIG. 16) may be controlled by software, firmware, or programmable hardware to flash or blink in a regular or irregular sequence. Other LED colors, such as, for example, white light LEDs, amber LEDs, green LEDs, blue LEDs, and the like may be used in combination with or separate from a red LED.

Figure 22:
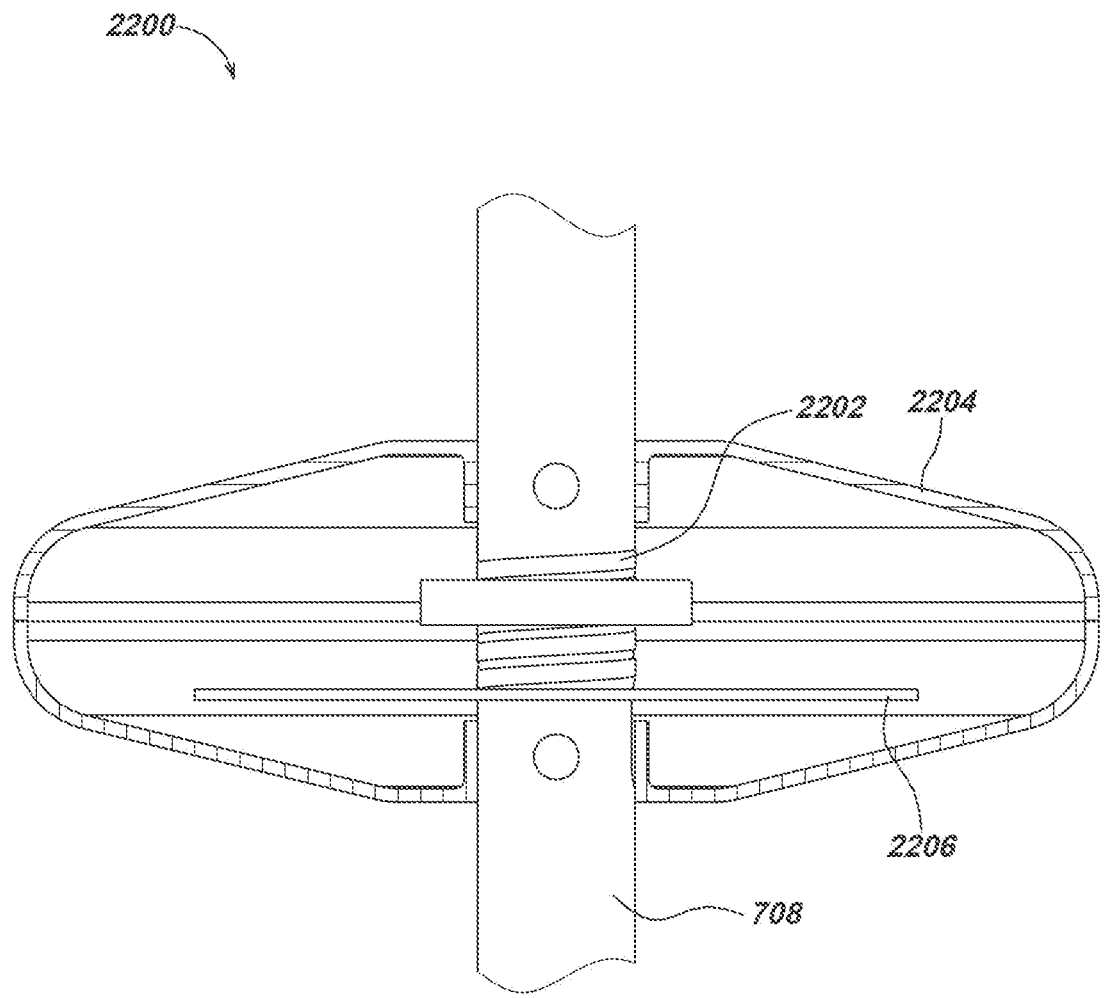
FIG. 22 is an illustration of a GPS antenna assembly configured with a helical antenna.

Turning to FIG. 22, an embodiment of a GPS antenna assembly 2200 may be formed with a helical coil of copper tape 2202 wrapped in right-hand ascending turns around the exterior of the section of mast 708 (FIG. 7) contained within the antenna shell 2204. The copper tape may be electrically connected to a matching network connected to the antenna feed. A ground plane 2206 may be formed of an aluminum or copper disk, for example. The copper tape 2202 helix may alternatively be connected to an optional balun (not shown) mounted on the ground plane 2206 and connected to the antenna feed to act as a line transformer for signal compatibility.

GPS/GLONASS satellites transmit a right-hand circular polarized (RHSCP) signal. An RHCP receiving antenna will reject some multipath signals which degrade accuracy of positions. Additional helices may be mounted on the same ground plane 2206 to modify the beam pattern. Alternate antenna designs may be used appropriate to application, such as for example, the dual antenna described in U.S. Patent Application Ser. No. 61/618,746, entitled DUAL ANTENNA SYSTEMS WITH VARIABLE POLARIZATION, filed Apr. 31, 2012, the entire content of which is incorporated by reference herein.

Figure 23:
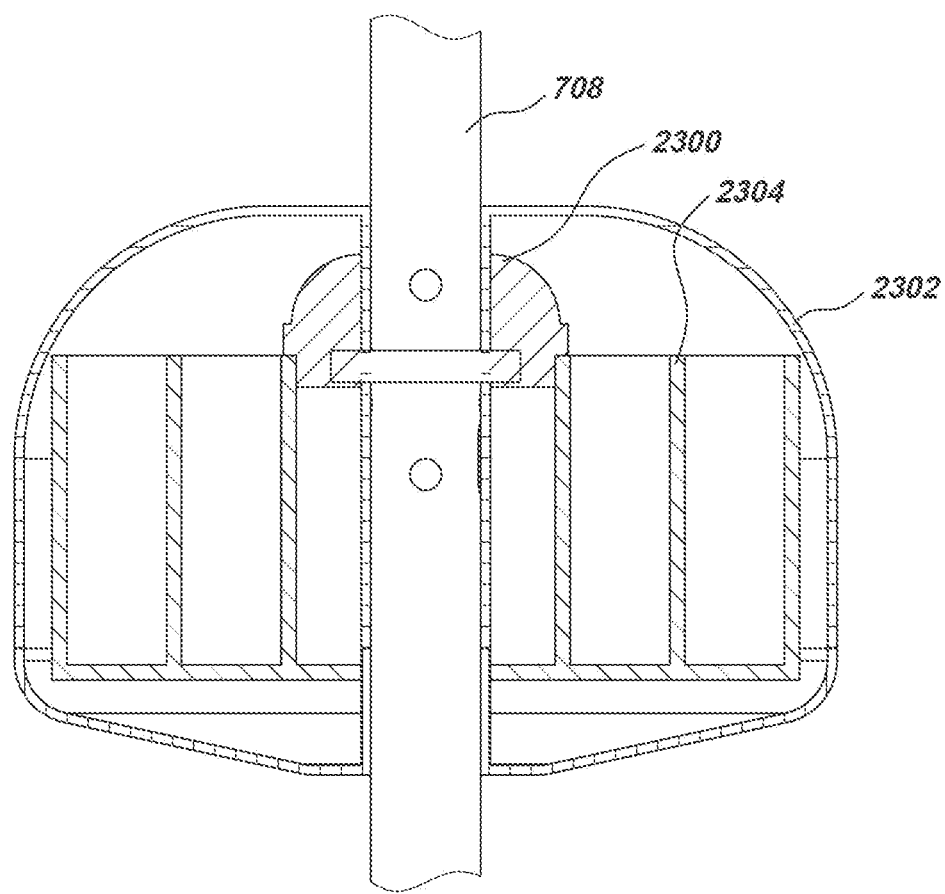
FIG. 23 is a section view of the GPS antenna assembly of FIG. 22 using a generic uniform choke-ring antenna.
Figure 24:
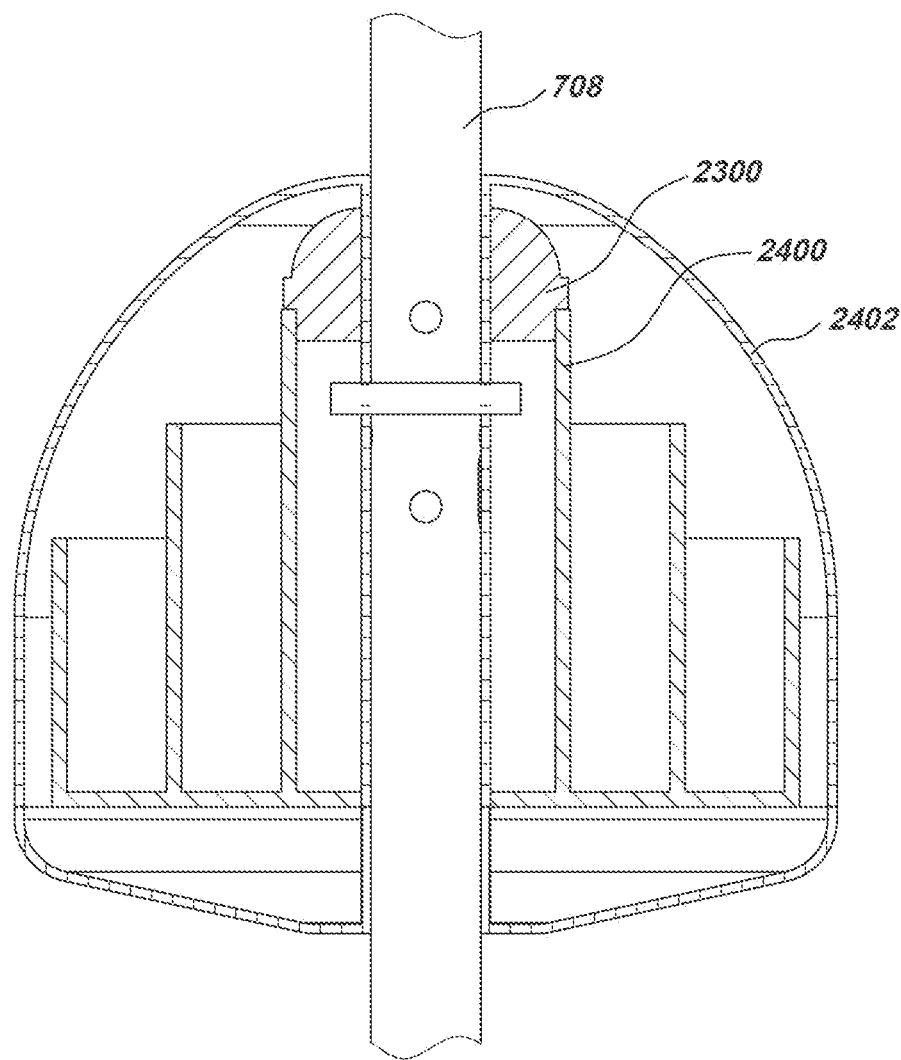
FIG. 24 is a section view of the GPS antenna assembly of FIG. 22 using a stepped choke-ring antenna.

Referring now to FIGS. 23 and 24, an alternative embodiment of the exemplary GPS module may use a commercially available GPS antenna element 2300, which may be centrally mounted within the antenna casing 2302 and may be fitted around mast 708 and centrally mounted on the central ring of a choke-ring ground plane 2304. The choke-ring ground plane 2304 may have a plurality of rings machined from a single block of aluminum or similar metal. The rings in this embodiment may be approximately 2.3 centimeters apart. The walls of the rings may be notched. The height of the rings may be uniform as illustrated in FIG. 23. A corresponding GPS sensor, such as, for example, a commercially available GPS processing chip or module, may be coupled to the antenna elements to generate output GPS data and information, such as positional and/or time data.

Referring to FIG. 24, an alternative embodiment of the choke-ring ground plane 2400 may have the rings of the choke-ring ground plane 2400 stepped downward by degrees. The design of casing 2402 may be modified as needed to accommodate the configuration of the stepped choke-ring ground plane 2400.

Figure 25A:
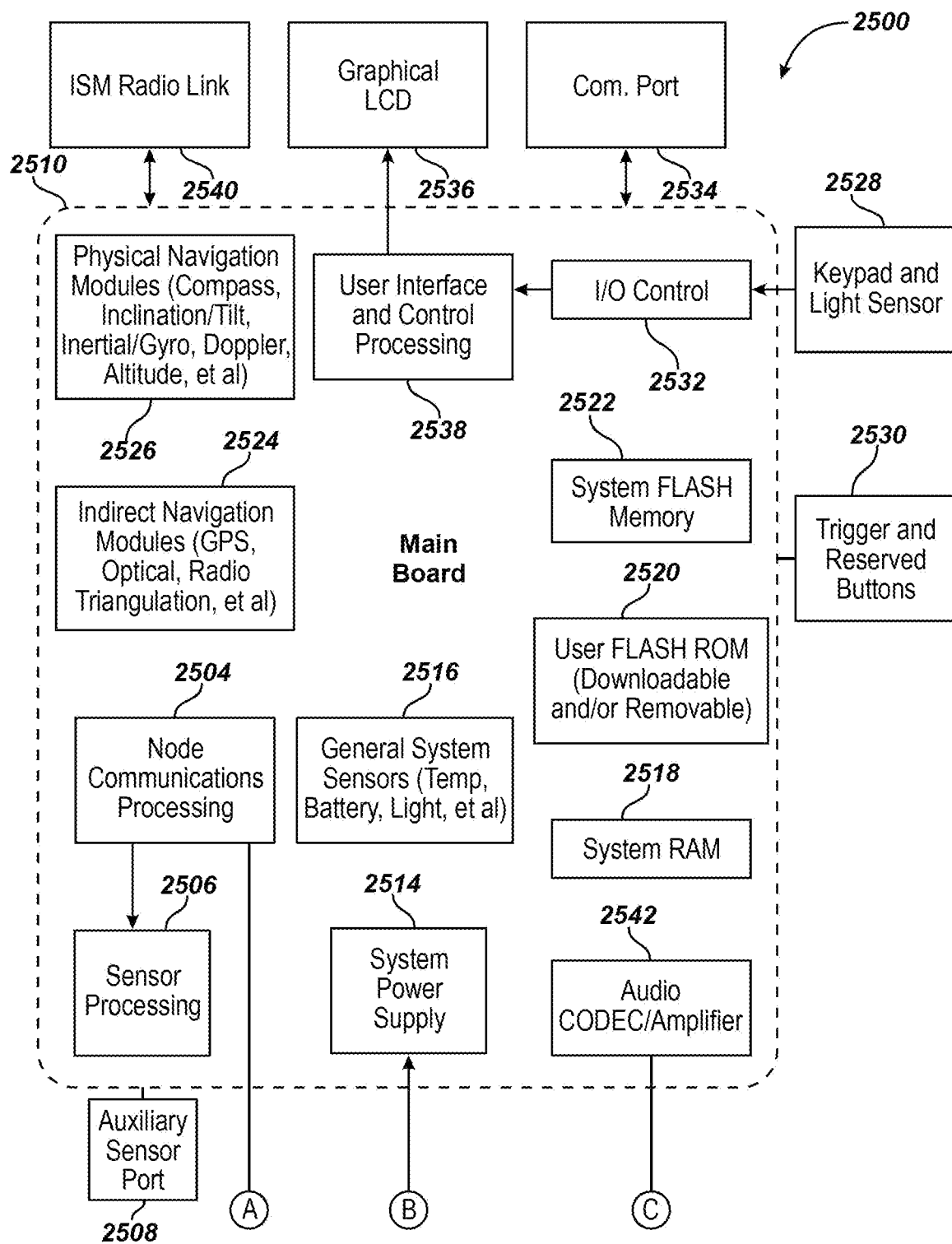
FIGS. 25A and 25B is a block diagram illustrating a locator configured with an embodiment of a dodecahedral antenna.
Figure 25B:
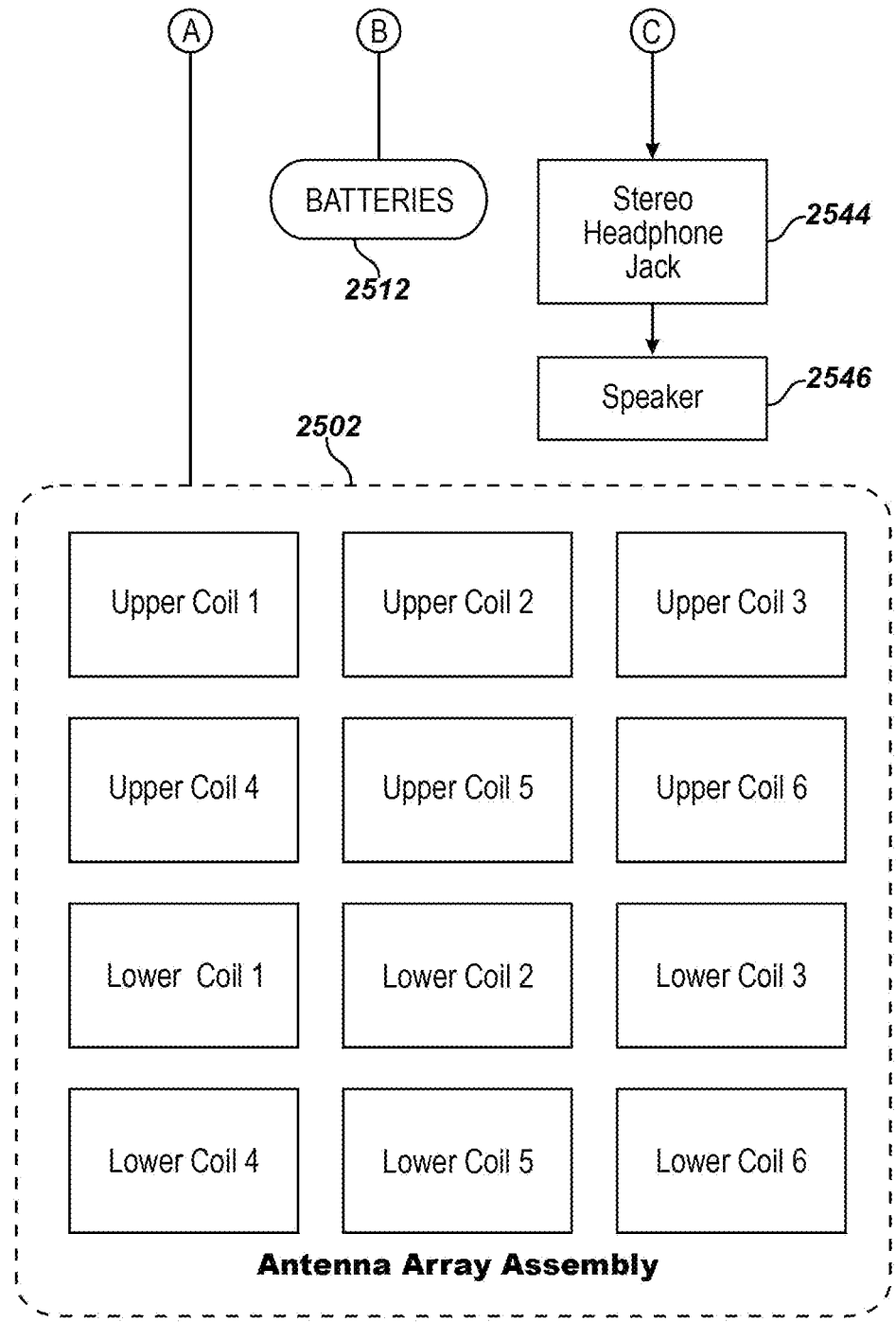

FIG. 25A and FIG. 25B are block diagrams illustrating details of a portable locator embodiment 2500 in accordance with the dodecahedral array 600 of FIG. 6. The various circuit elements as shown in FIG. 25A and FIG. 25B may comprise a processing element as described herein. An antenna assembly 2502 may, for example, include the twelve coils as illustrated in FIG. 6. Signals from the antenna array assembly 2502 may be fed to a node communications processing circuit 2504 which in turn may feed a sensor processing circuit 2506. The sensor processing circuit 2506 may also receive inputs from an auxiliary sensor port 2508. Both the node communications processing circuit 2504 and the sensor processing circuit 2506 may be located on a main circuit board set 2510 located within the housing (not shown) of the locator. A set of batteries 2512 may be mounted within the housing and may be connected to a system power supply 2514 on the main circuit board set 2510. The main circuit board set 2510 may also support general system sensors 2516 such as temperature, battery level, light level, for examples, which are indicated diagrammatically. The main circuit board set 2510 may also include system RAM 2518, user flash ROM 2520, and/or system flash memory 2522, for example. Navigation modules 2524 such as GPS, optical, radio triangulation, etc., may also be supported on the main circuit board set 2510. Optional physical navigation modules 2526, such as a compass, inclination/tilt sensor, inertial/gyro Doppler radar, altimeter, etc., may be supported on the main circuit board set 2510. A keypad and light sensor circuit 2528 as well as trigger and reserve push buttons 2530 may be mounted in the housing. The sensor circuit 2528 and the push buttons 2530 may be connected to an input/output control circuit 2532 mounted on the main circuit board set 2510. A communications port 2534 may be connected to the input/output control circuit 2532. A graphical liquid crystal display 2536 mounted in the housing, for example, may be driven by a user interface and control processing circuit 2538. An ISM radio link 2540 may be connected to the main circuit board set 2510. An exemplary audio amplifier 2542 on the main circuit board set 2510 may drive either headphones (not illustrated) through a headphone jack 2544 or a speaker 2546.

The use of multiple antenna arrays used in locating either dipole or linear electro-magnetic fields presents a number of challenges in analysis and software design in order to locate the center of the target field. The exact procedure will vary with the kind of field, the number of antennas used, and the variety of supplemental sensors which are also deployed.

Figure 26:
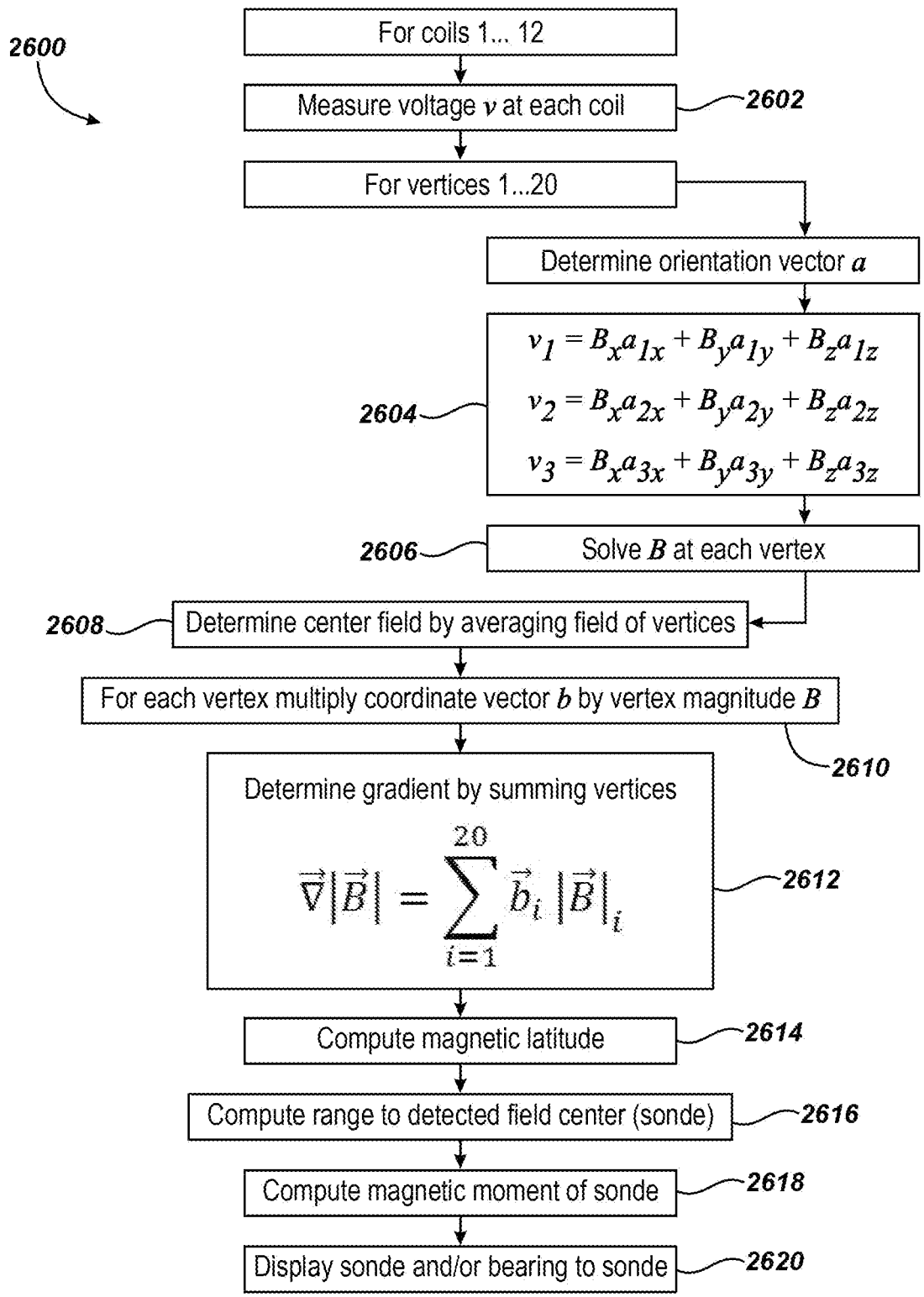
FIG. 26 is a flow chart illustrating a locating process for a dipole transmitter (sonde) configured with an embodiment of a dodecahedral antenna.

Turning to FIG. 26, a flow chart illustrates details of an example process embodiment 2600 for determining and displaying the location of a dipole sonde in one exemplary application of the dodecahedral antenna configuration. The dodecahedron form may have twelve faces whose conjunctions form twenty vertices. Each face of the dodecahedron antenna array may have a coil centrally situated parallel to the face. A measuring step 2602 may capture the value of the measured voltage y at each of the twelve coils of the antenna array.

For each of the twenty vertices formed by the twelve faces of the dodecahedron a computation 2604 may determine the field for that vertex. This computation may be performed for each vertex in step 2606. The field at the center of the dodecahedral array may be then solved in step 2608 by averaging the fields of the vertices.

For each vertex, the field magnitude may be determined by multiplying the vertex's coordinate vector by the vertex's magnitude in step 2610. The gradient of magnitude may be calculated by summing all vertices in step 2612. Using the angle between the B field and the gradient of the magnitude as a variable the magnetic latitude may be calculated in step 2614, from which the range to the sonde may be computed (step 2616) as:

$$\frac{|\vec{B}|}{|\vec{\nabla}|\vec{B}||} = rf(\lambda)$$

where $f(\lambda)$ is evaluated from:

$$f(\lambda) = \frac{1}{6}\sqrt{\frac{(\cos^2(\lambda) + 4\sin^2(\lambda))(10 - 6\cos(2\lambda))}{(\cos^4(\lambda) + 9\cos^2(\lambda)\sin^2(\lambda) + 16\sin^4(\lambda))}}.$$

Given that the magnetic latitude, field strength at the center of the antenna array, and the distance r are known, the magnetic moment of the sonde may be computed in step 2618. It is therefore possible to compute the field at every point in space. This enables the display on the locator of the bearing to the sonde, for example, and/or a graphic representation of the sonde's poles and equator (depending on distance scaling in the display 2620).

Figure 27A:
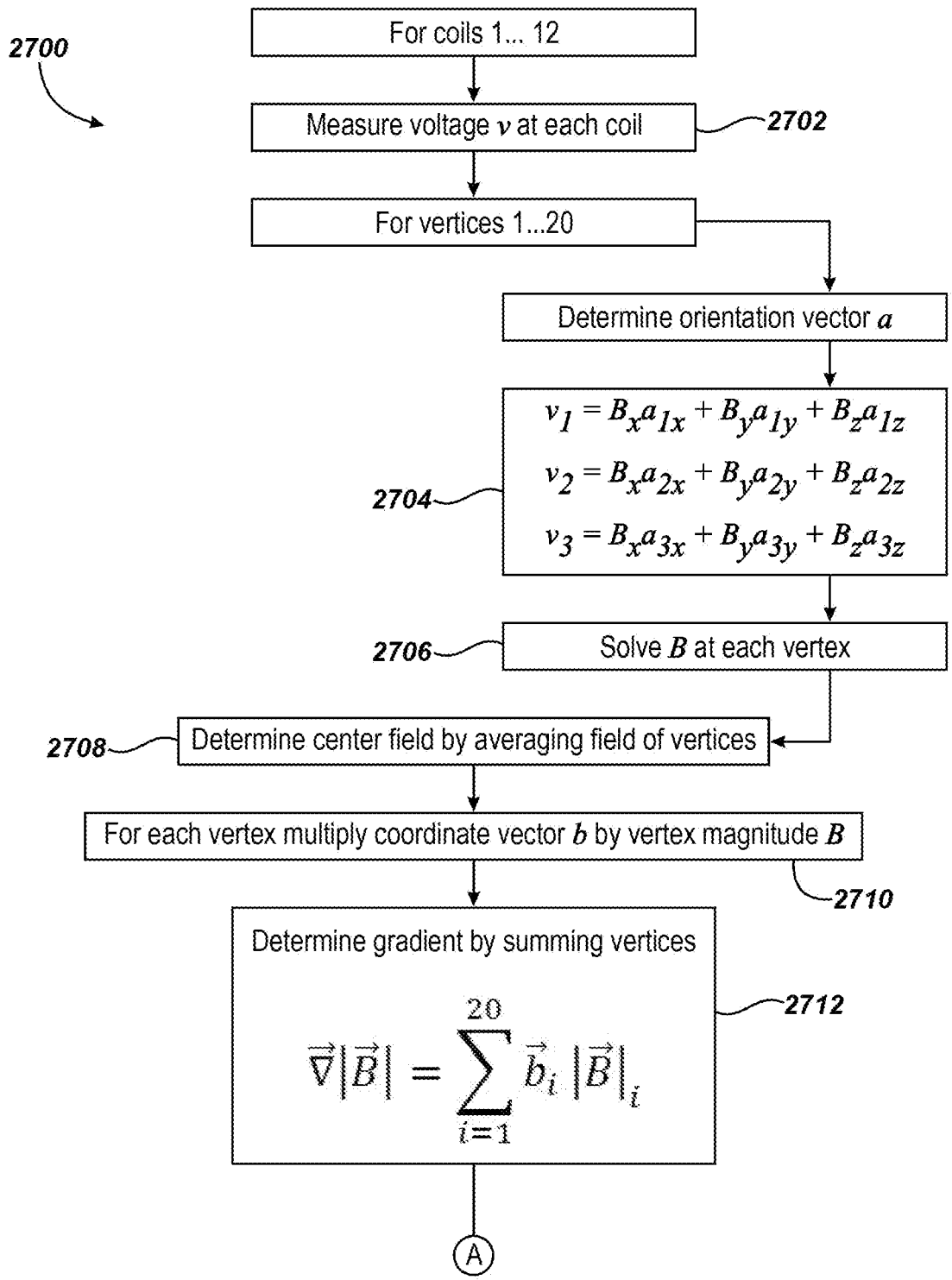
FIGS. 27A and 27B is a flow chart illustrating a locating process for a line-tracing application using an embodiment of a dodecahedral antenna.
Figure 27B:
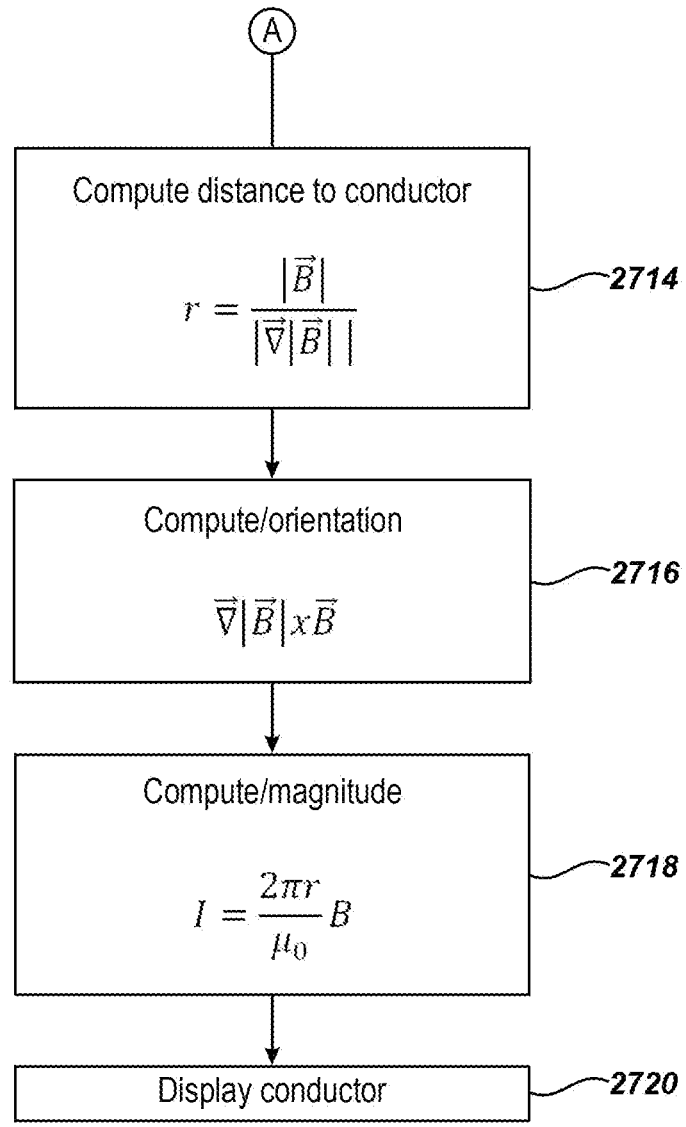

Turning to FIG. 27A and FIG. 27B, a similar procedure 2700 may be used for calculating and displaying the path to the center of a detected linear conductor such as a cable or buried pipeline, for example, using a locator with a dodecahedral antenna array.

In FIG. 27, the procedure 2700 may be identical to the dipole sonde procedure 2600 in each step up through step 2712, in which the gradient of the target field may be determined by summing the coordinate vector cross product with the field magnitude of each of the twenty vertices. For example, steps 2702, 2704, 2706, 2708, 2710, and 2712 may correspond to steps 2602, 2604, 2606, 2608, 2610, and 2612 of FIG. 6, respectively. The distance to the long conductor may then be calculated in step 2714 by the quotient of the magnitudes of $\vec{\nabla}|\vec{B}|$ and $\vec{B}$. The same values produce a cross-product in step 2716 which may provide the orientation of the conductor current I. The magnitude of the current may be calculated in step 2718 as:

$$I = \frac{2\pi r}{\mu_0}B.$$

With the values for I's orientation, distance and magnitude known, the locator can then display the relative position and direction of the conductor.

An alternative process may also be used which would entail using only the voltage values at each coil v1 to v12 directly instead of the vertex calculated values. In this approach, each coil's voltage may be used directly to calculate the components of the B field and its gradient tensor G at the center of the dodecahedron. The gradient tensor of the field is a 3×3 tensor with only 5 independent components. For example, the nine components of the gradient tensor G can be written using just five components in the set {gxx, gxy, gxz, gyy, gyz} as G=((gxx, gxy, gxz), (gxy, gyy, gyz), (gxz, gyz, (−gxx −gyy))) and these values for g may be computed mathematically based on the relationships of the voltages of the coils at different faces of the dodecahedron. These tensor components may be useful for identifying tee junctions, bends, and other deviation from straight lines in buried utilities.

Figure 28A:
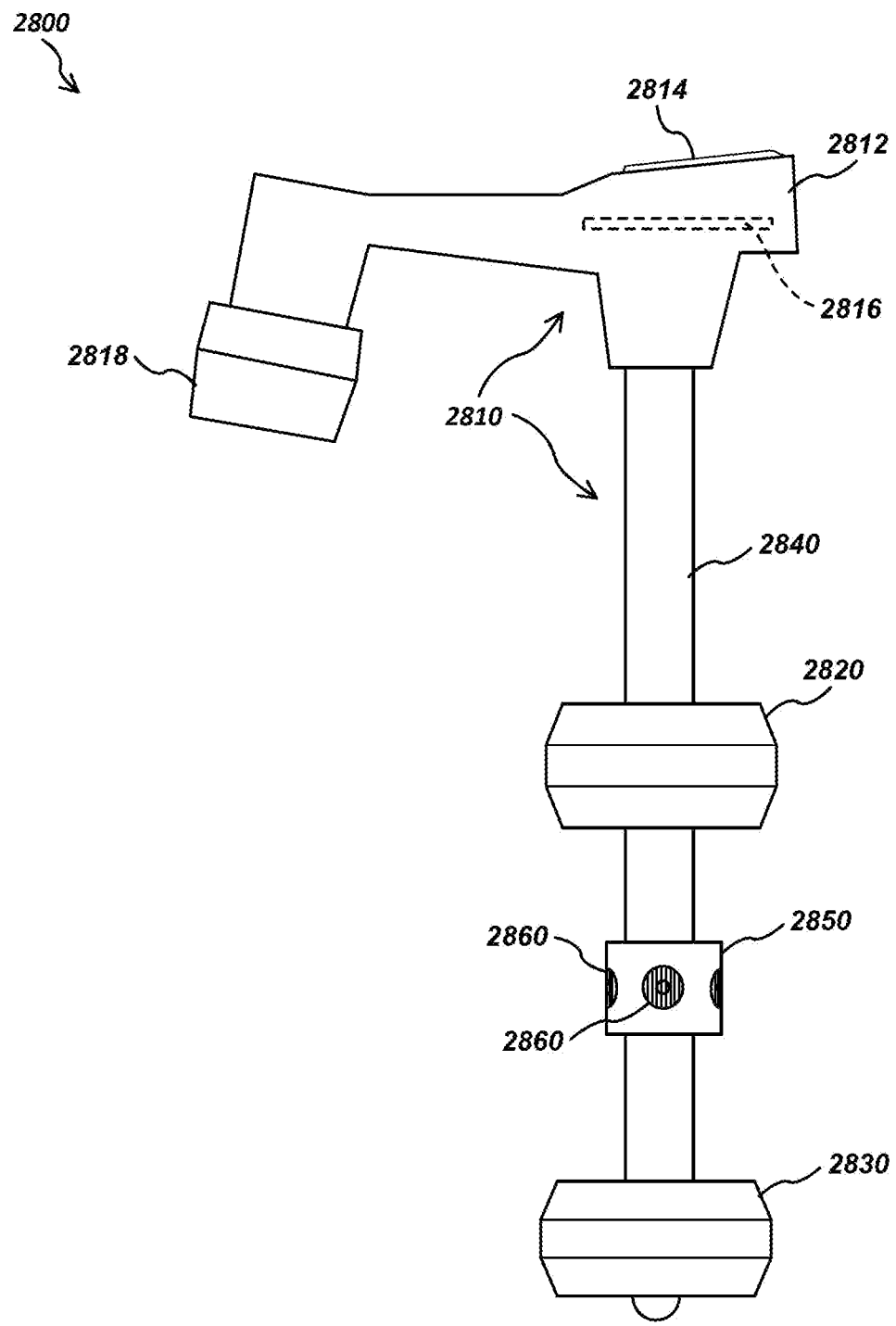
FIG. 28A illustrates details of an embodiment of a locator including a safety light apparatus.

FIG. 28A illustrates details of another locator embodiment 2800 in accordance with certain aspects. Locator 2800 includes a body 2810, which includes a head unit 2812, a mast 2840, as well as other mechanical and coupling components (not shown). Coupled to the body are one or more antenna nodes, such as, for example, antenna nodes 2820 and 2830. These nodes may be configured as gradient and/or dodecahedral antenna nodes as described previously herein. Head unit 2812 may include various electronic, optical, electrical, and mechanical elements. For example, head unit 2812 may include one or more displays 2814, such as LCD or other displays, which may include touch screen user input functionality. One or more switches or other buttons or actuators (not shown) may also be included in head unit 2812. One or more electronics modules 2816, such as, for example, one or more PCBs or other electronic modules may be included in head unit 2812 to implement processing elements, signal conditioning circuits, or other analog, digital, or optical functions. Alternately, or in addition, additional electronics modules (not shown) may be included in the mast 2840 and/or the antenna nodes 2820, 2830, such as the electronics modules and circuits described previously herein. Head unit 2812 may further include a battery 2818 and associated battery mounting and coupling mechanisms (not shown) to couple the battery mechanically and electrically to the body and head unit. In addition, locator 2800 may include one or more safety lighting assemblies 2850, which may include lighting elements such as multiple LED light units 2860.

Figure 28B:
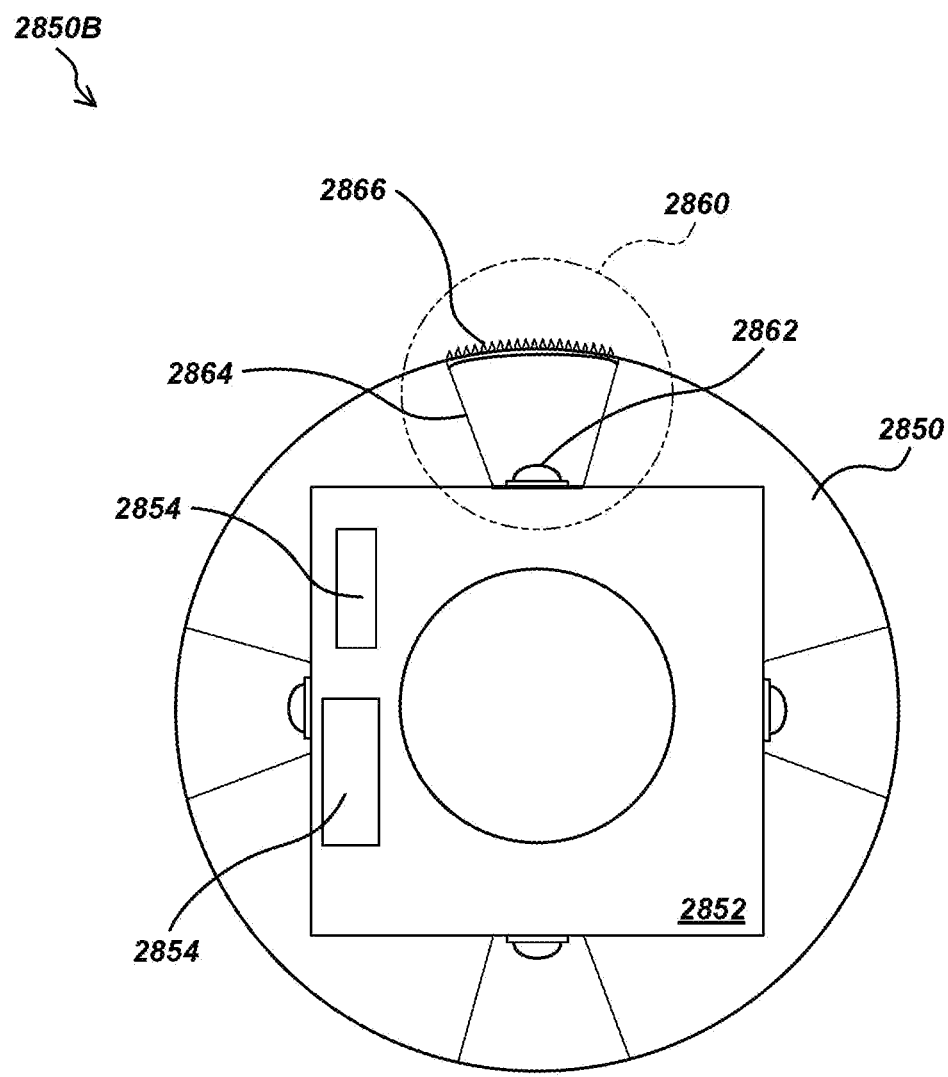
FIG. 28B illustrates details of an embodiment of a safety light apparatus as may be used on a locator such as the locator embodiments of FIG. 28A, 29, 32, or 33.
Figure 28C:
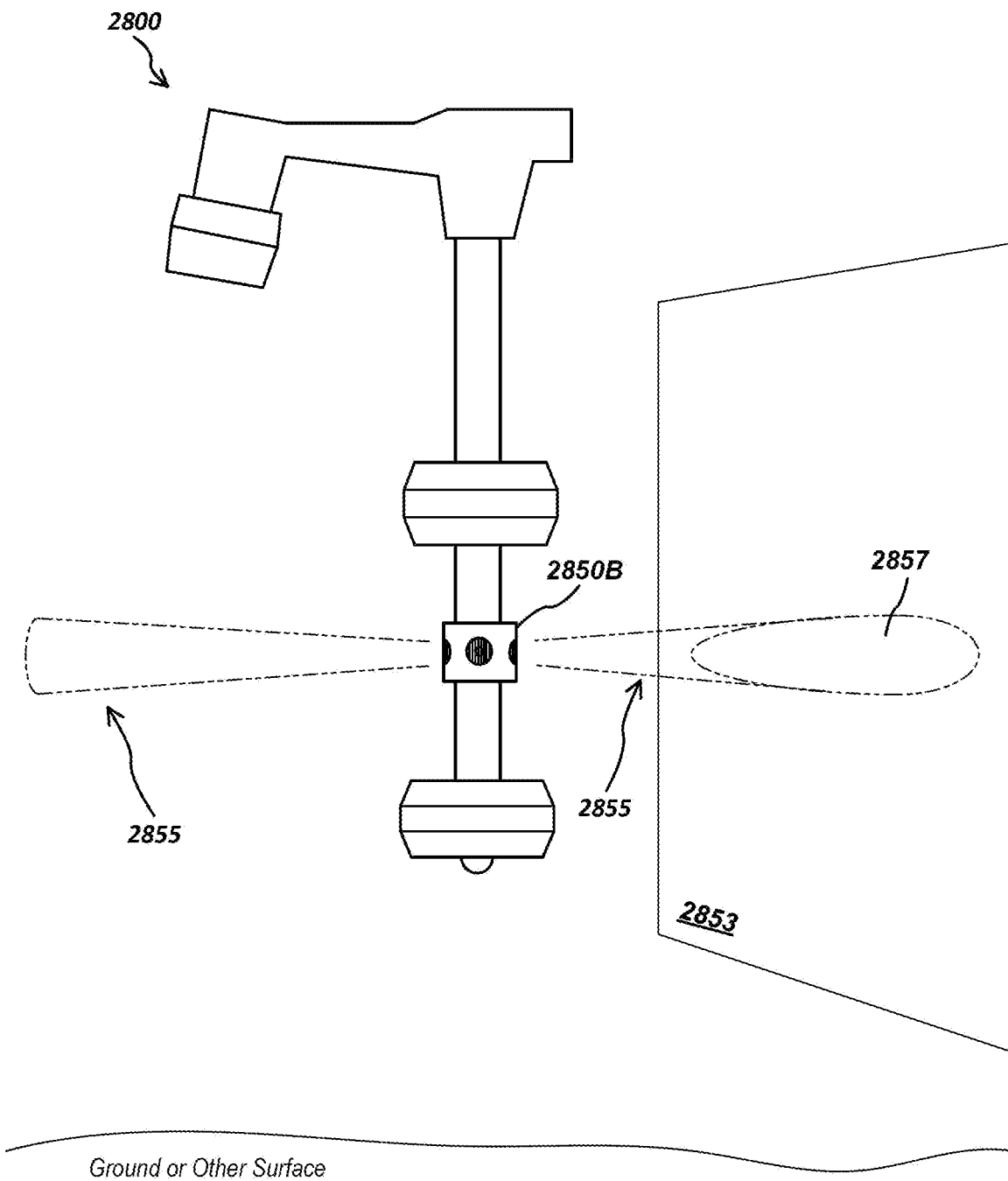
FIG. 28C illustrates details of a safety light fan-beam pattern, as shown from the side, provided from a locator such as the locator embodiments of FIG. 28A, 29, 32, or 33.
Figure 28D:
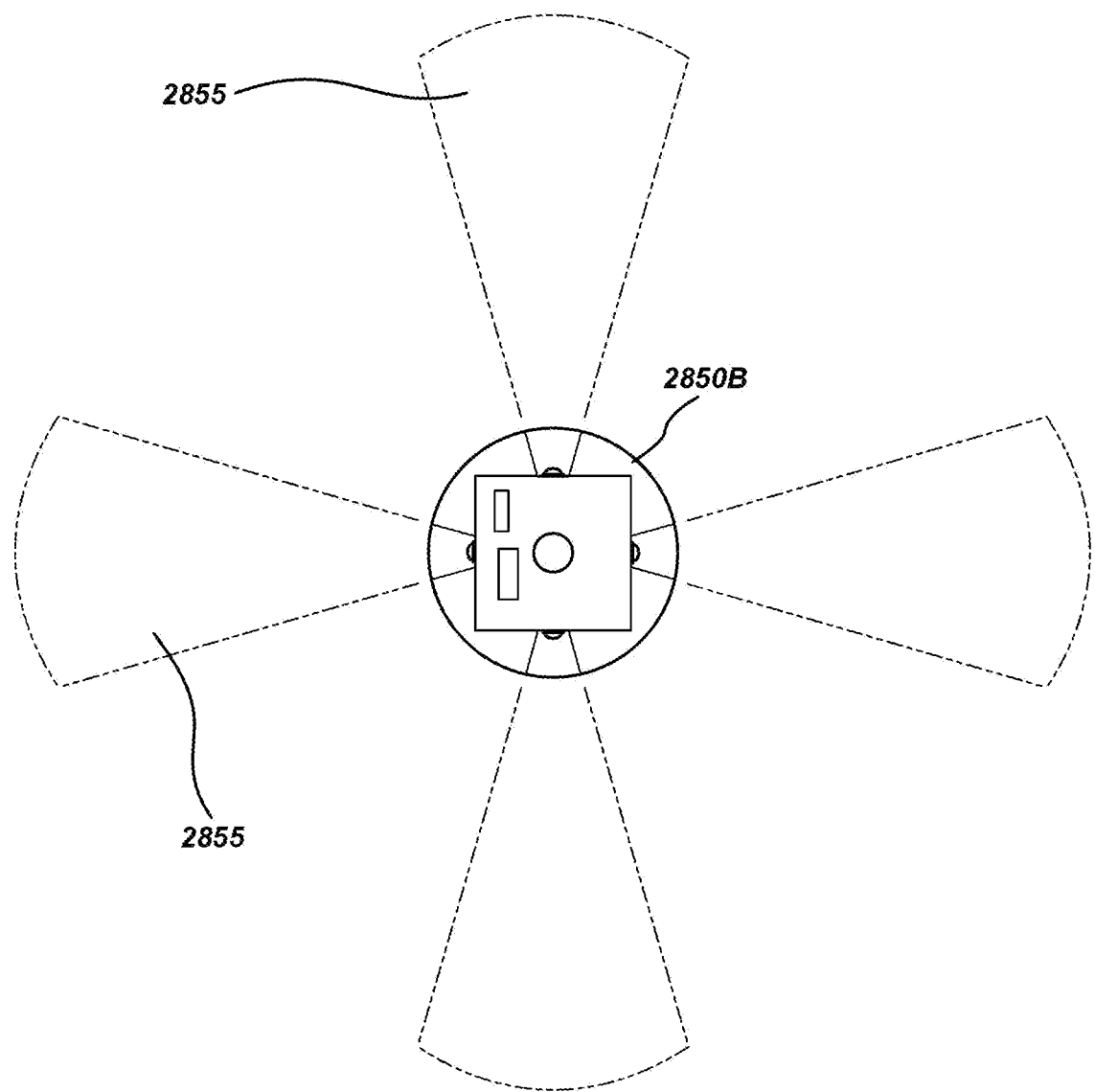
FIG. 28D illustrates details of the safety light fan-beam pattern of FIG. 28C as shown from the top.

FIG. 28B illustrates additional details of a safety lighting assembly embodiment 2850B, which may correspond with safety lighting assembly 2850 of FIG. 28A. For example, lighting assembly 2850B may include four LED light units 2860, each of which may include a TIR reflector 2864, a high output LED 2862, such as the Cree LEDs described previously, and an optic 2866, such as a vertical grating, to direct output light, preferably in a substantially planar direction, such as in a fan pattern. In addition, lighting assembly may include a housing or body, one or more electronics circuits or modules, such as printed circuit board 2852, which may include analog or digital electronic components 2854 to control light output from the LEDs, and/or other elements (not shown), such as a processing element of the safety lighting assembly (e.g., in the form of processor devices such as one of devices 2854). In some embodiments, a lighting assembly may not include electronics to control LED light outputs—for example, this may be done in a processing element of the locator, such as in a head unit or other locator component.

FIG. 28C illustrates an example substantially planar light output from a locator equipped with a safety lighting assembly such as assembly 2850B of FIG. 28B, as seen from a side view. In FIG. 28C, locator 2800 is oriented in a vertical position relative to the ground or other surface. A wall 2853, to the right of the locator, reflects a light 2857 from a beam 2855 generated by an LED light unit of light assembly 2850B. Seen from this angle, the reflected light 2857 from one of the LED light units forms a substantially planar, elliptical reflection from the wall 2853. In effect, light propagates outward from the locator primarily in a plane rather than going in all directions, thereby allowing for a more concentrated light output in the planar dimensions. This may be particularly advantageous when providing sufficient safety lighting to signal vehicle drivers and others of the presence of a locator user during bright daylight hours by directing safety lighting primarily towards and in the plane of vehicle drivers or others approaching a locator user.

FIG. 28D illustrates the output light beam patterns 2855 from light assembly 2850B as seen in FIG. 28C from a top view. In this orientation, the individual beams from each LED light unit can be seen to be in a fan-like shape, and are contained primarily in the plane of the drawing sheet. In other embodiments using different optics, the pattern may be different from the fan pattern shown; however, the desired output in typical embodiments is substantially planar light in the directions shown. In this example four beams from four LED light units are shown, with each beam covering approximately 30 degrees. In some embodiments, individual beam angles may be larger, such as up to 70 degree or more, thereby requiring fewer LED light units and/or providing more complete coverage fill. Alternately, more LED light units may be used, such as is shown in FIGS. 28E and 28G, where six are used.

Figure 28E:
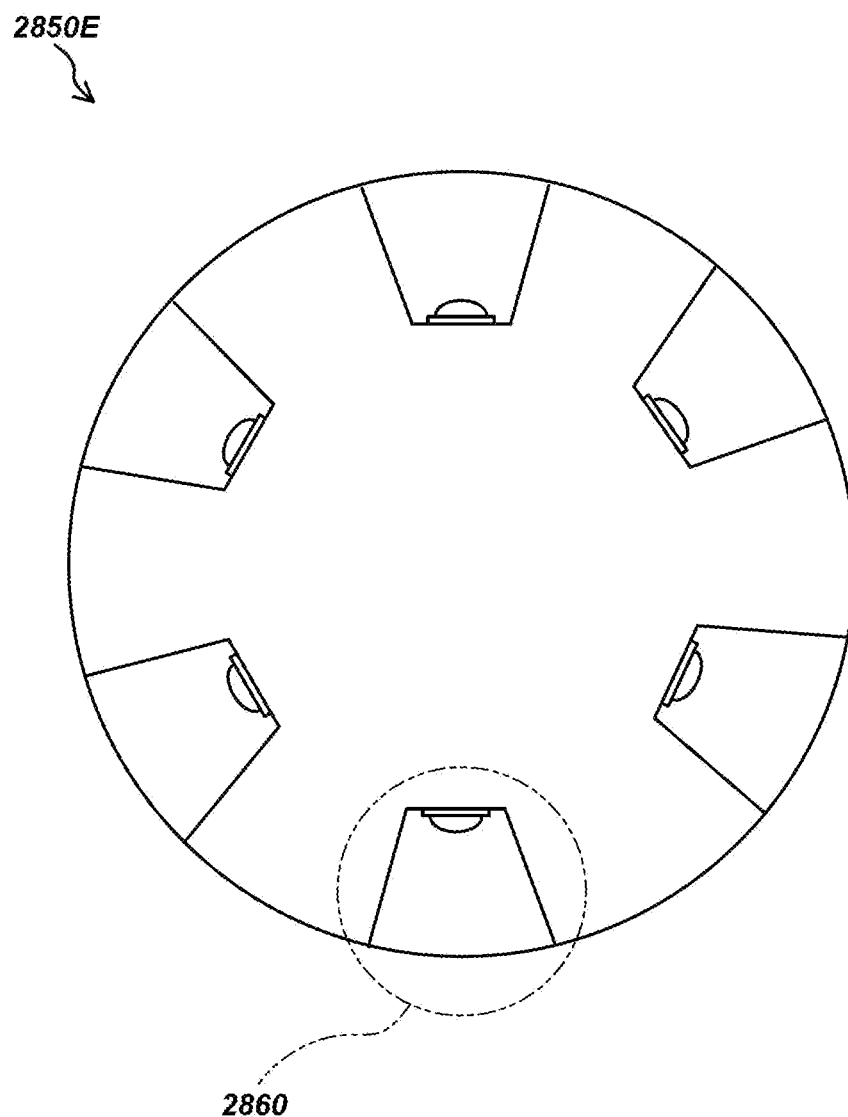
FIG. 28E illustrates details of another embodiment of a safety light apparatus as may be used on a locator such as the locator embodiments of FIG. 28A, 29, 32, or 33.

For example, FIG. 28E illustrates another embodiment of a light assembly 2850E including six LED light units 2860, rather than four, each generating a beam 2857. As shown in FIG. 28G, depending on the particular optics used, more LED light units may provide a more complete planar light pattern (as compared to the pattern shown in FIG. 28D, but at the expense of additional LED light units). Various embodiments may use different numbers of LED light units, depending on the desired coverage area. In some embodiments, output light patterns may be configured to be less than 360 degrees as shown in FIGS. 28D and 28G. For example, in some embodiments, only approximately 90 degrees, 180 degrees, or 270 degrees of coverage may be used. This may depend, for example, on the desired safety light coverage area and operator position during use.

Figure 28F:
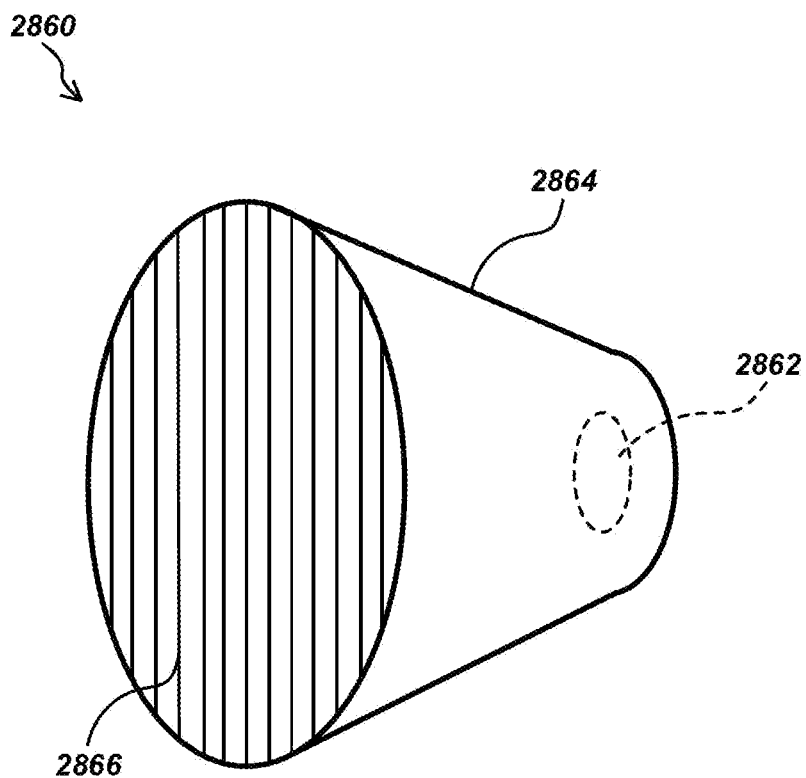
FIG. 28F illustrates details of one embodiment of a fan-beam light assembly as may be used in a safety light apparatus such as shown in FIG. 28B or 28E.
Figure 28G:
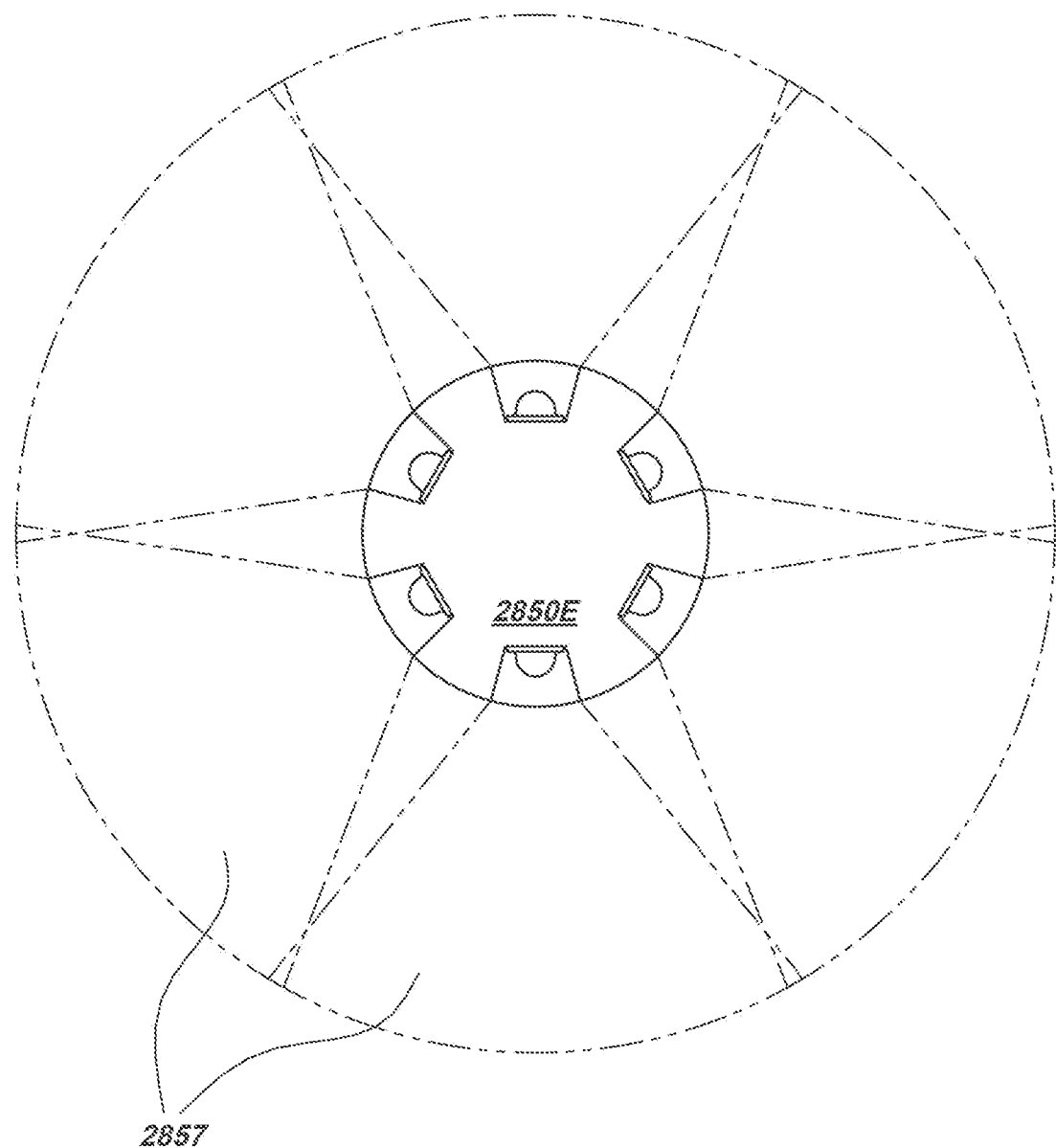
FIG. 28G illustrates details of overlapping safety light fan-beam patterns from the safety light apparatus of FIG. 28E showing omnidirectional planar lighting coverage.

FIG. 28F illustrates additional details of LED light unit embodiment 2860. As shown, LED light unit 2860 may include a high output LED 2862, which may be, for example, a red, amber, blue, green, white, or other light output color. The output color may be selected based on a particular operating environment and required visibility. For example, amber lights may provide better daylight visibility, whereas red lights may provide better night visibility. In some embodiments, multiple LEDs may be used, and the LED output color and/or power level may be selected, such as in a processing element, based on the environmental conditions, such as the ambient lighting. A reflector 2864, such as a TIR reflector element, and an optic 2866, such as a vertical grating or prism structure as shown, to direct light to the sides (horizontally in the orientation shown) may be used to provide the substantially planar output light beam pattern.

Figure 29:
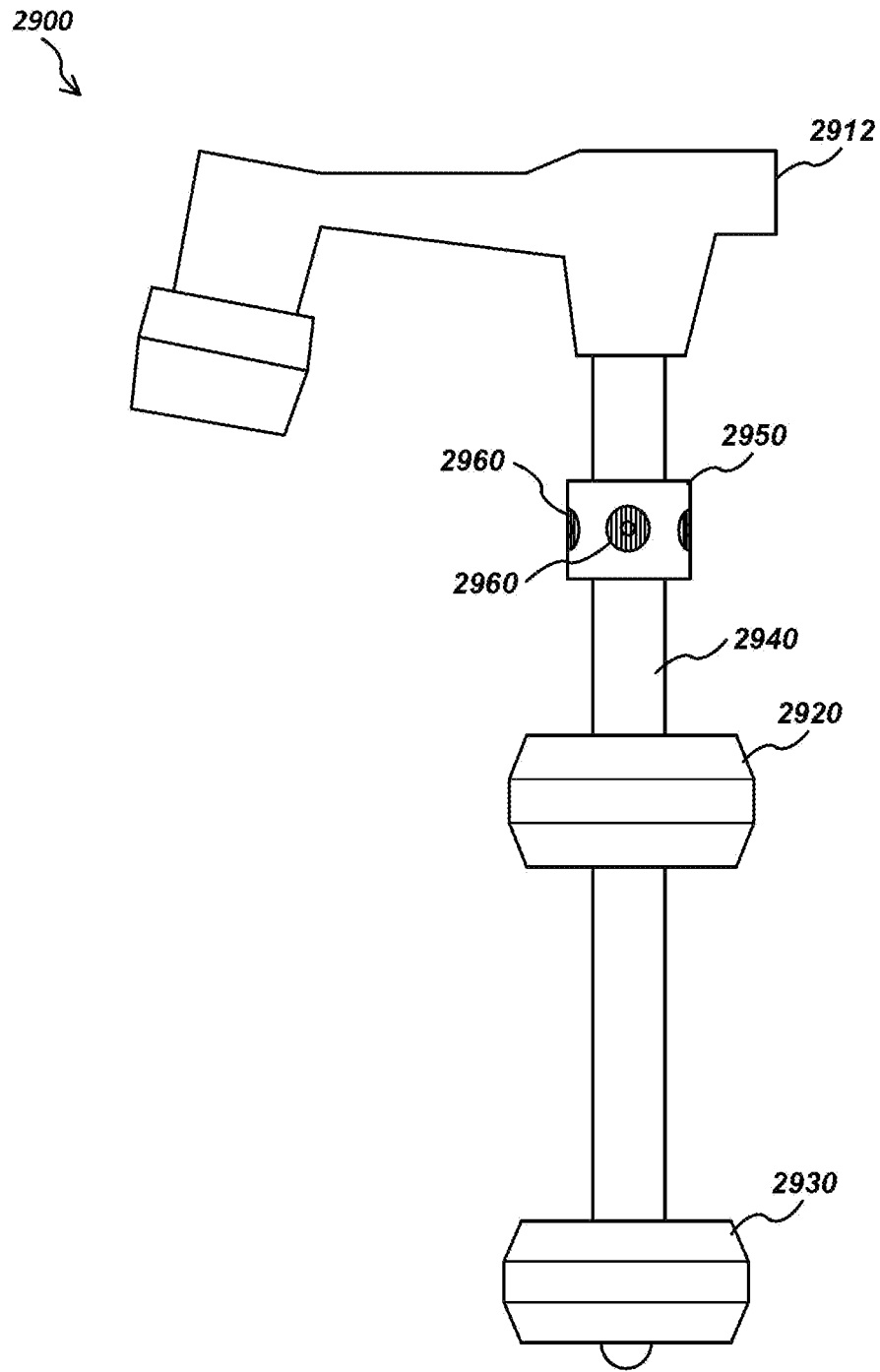
FIG. 29 illustrates details of another embodiment of a locator including safety lighting wherein the safety light apparatus is positioned near the top of the locator when oriented in a normal operating position.

FIG. 29 illustrates details of another embodiment of a locator 2900 including a safety light assembly 2950, with a plurality of LED light units 2960, in this case positioned near the top/head unit 2912, above antenna nodes 2920 and 2930. By positioning the safety light assembly near the top, greater visibility may be provided in some applications, depending on operator positioning of the locator during use. As shown in FIG. 29, safety light assembly 2950 is positioned around mast 2940; however, in other embodiments, safety light assembly 2950 may be positioned within or integral with mast 2940 or on or within head unit 2912.

In an exemplary embodiment, safety light assembly 2950 may be configured in locator 2900 (or in other locators as described herein) to be on at all times during locator operation. This may be used, for example, to ensure operator safety any time the locator is turned on. Constant-on operation of the safety lighting assembly may be coupled with ambient light control, such as by automatically controlling output light level and/or pulse patterns based on sensed ambient light, to reduce power consumption when ambient light levels are low (or correspondingly increase power and/or duty cycle or pulse configurations when ambient light levels are high). In other embodiments, operators may be provided with a switch or software/user interface option to turn on or off the safety light and/or to adjust output control, such as to adjust output light patterns, pulse sequences, colors, and the like. The output lighting configuration may also be controlled by programmable software or in programmable hardware, such as through use of flash memory or other programmable media.

Figure 30:
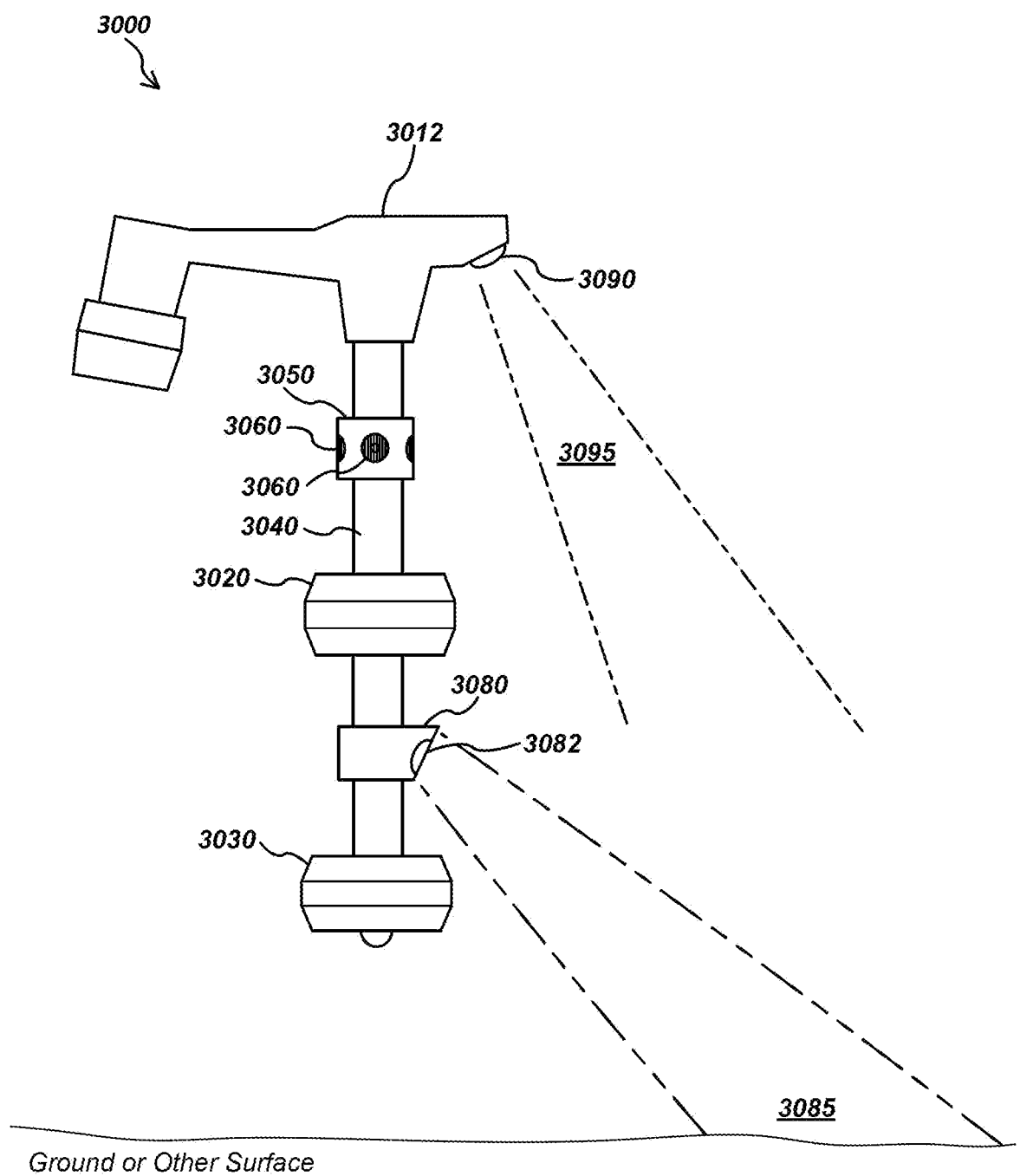
FIG. 30 illustrates details of another embodiment of a locator including a safety lighting apparatus and a surface lighting apparatus to provide illumination for a locator camera.

FIG. 30 illustrates details of another embodiment of a locator 3000 including a safety light assembly 3050, with a plurality of LED light units 3060, disposed around a mast 3040 and positioned near a top/head unit 3012, above antenna nodes 3020 and 3030. In other embodiments, however, safety light assembly 3050 may be positioned in or integral with mast 3040 or on/in a head unit 3012 or elsewhere on or within a locator body, such as on or within the locator bodies as shown in FIG. 32 and FIG. 33. Locator 3000 may further include a surface light assembly 3080 and a camera 3090. In this configuration, surface light assembly 3080 may include one or more lighting elements, such as one or more LEDs 3082, which may be directed downward as shown to illuminate the ground or other surface with a light beam 3085.

A camera 3090 may be included in the locator, such as in the head unit 3012, and may be used to view and image an area 3095, such as an area of the ground or other surface. The camera may be, for example, a video camera, still camera, infra-red video or still camera, or combination of these or other camera devices, such as in the form of a camera module or sub-system. This may be used, for example, to provide an image log of the ground surface in conjunction with locate results, to estimate or track motion, and/or for other imaging purposes. Surface light assembly 3080 may further includes lenses or other optical components (not shown) to control the output light beam 3085, as well as electronics, mechanical mounting components, and the like (not shown). In an exemplary embodiment, surface lighting assembly 3080 may be controlled by a user interface function on the head unit 3012 of the locator, such as through a switch or other input element, and the output may be controlled by a processing element (not shown) in the head unit 3012. Output light levels from surface camera 3080 may be integrated and/or controlled in conjunction with operation of camera 3090, such as to provide higher light outputs when required due to dark surfaces, lower ambient light conditions, etc.

As noted previously herein, in various embodiments, predefined output light patterns may be loaded into the locator and/or selected or programmed by an operator to control the output light and visibility profile of the safety lighting assembly. For example, certain light patterns may provide more visibility and/or depth indication to vehicle drivers or others approaching a locator user. In some cases, a user may wish to conserve power, such as by reducing the duty cycle, number of pulses in an output light pulse train, and pulse shape. Alternately, a particular light pattern or patterns may provide enhanced visibility under certain ambient lighting conditions, such as during bright daylight, when higher power and/or longer or shorter duty cycles may be advantageous.

Figure 31:
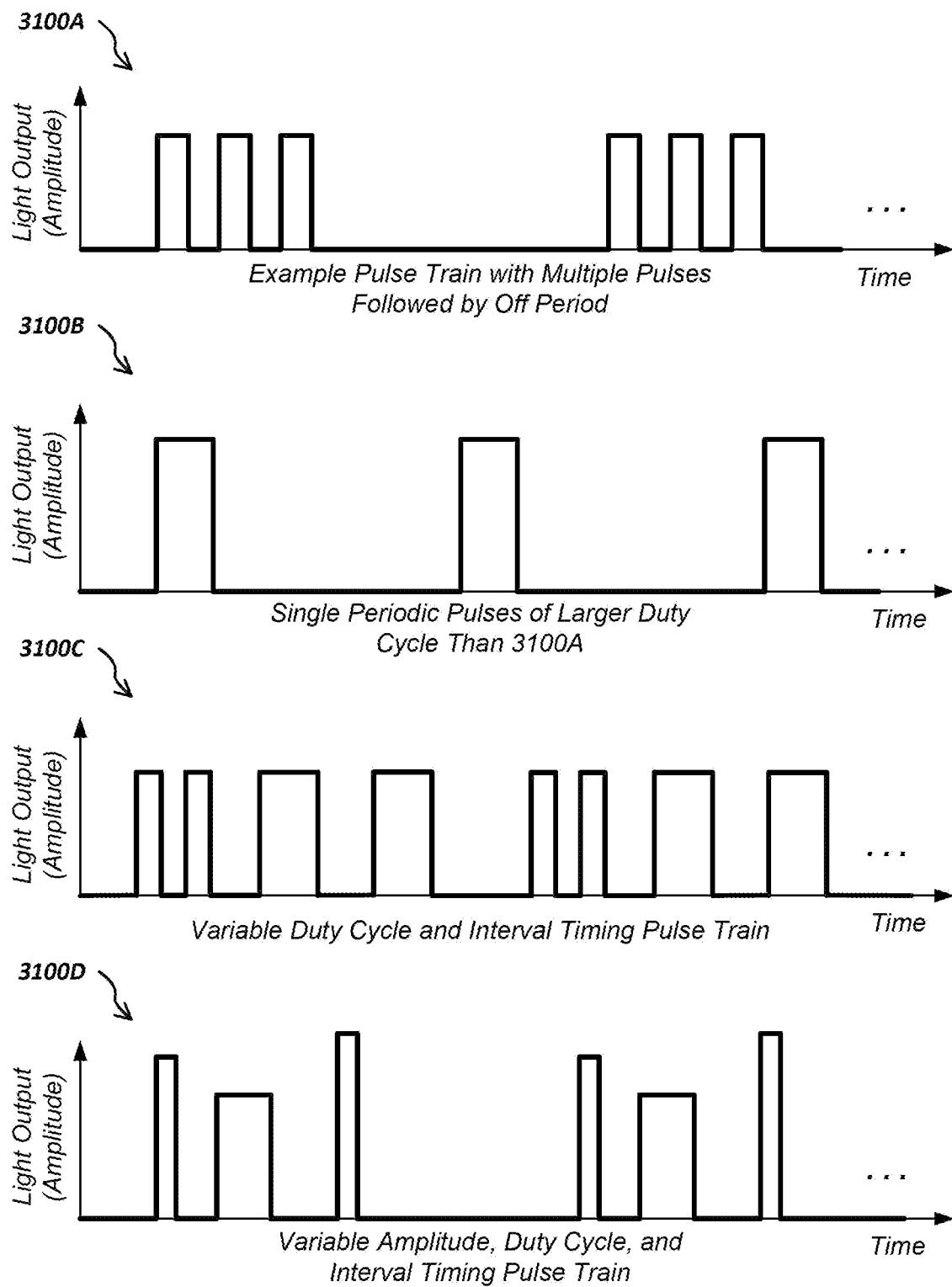
FIG. 31 illustrates details of various example embodiments of output lighting signaling to provide pulsed light for safety alerting.

By varying the output light pulse patterns, such as shown in FIG. 31, various optimized outputs may be obtained. These may include varying the number of pulses, duty cycle, off-timing between pulses, amplitudes, light colors (not shown in FIG. 31), frequency, and the like. For instance, example pulse pattern 3100A illustrates a pulse train or sequence of three pulses followed by an off-period, where less or no output light is generated. This pattern may repeat as shown periodically or may be combined with other patterns, either periodically or asynchronously.

For example, pulse pattern 3100B illustrates a single pulse, periodic pattern with a longer duty cycle. This pattern may be advantageous at night or in conditions where a longer pulse duration is desirable, particularly if operated at a lower amplitude (due to the longer duty cycle). Pulse pattern 3100C illustrates a pulse train sequence of varying duty cycle and duration between pulses. This may be used with, for example, output light from different LED light units, where each unit generates part of the output light sequence. Pulse pattern 3100D illustrates yet another example of a pulse pattern wherein the amplitudes, duty cycle, and spacing between pulses is varied. It is noted that, while certain pre-defined pulse patterns are illustrated for example purposes, in various embodiments, combinations of these patterns and/or other pre-defined patterns may also be used to generate an appropriate output light providing optimization of visibility, battery life, and/or other parameters.

FIG. 32 illustrates details of another locator embodiment 3200 (as seen from a side view) in an alternate form factor. Locator 3200 includes an integral body 3210 including a display/user interface 3212 and one or more antennas, such as internal antennas 3220 and 3230. In this alternate locator configuration, a safety light assembly 3250, with a plurality of LED light units 3260, which may be configured similarly to the safety light assemblies described previously herein, may be disposed on or within the locator body 3210.

FIG. 33 illustrates details of yet another locator embodiment 3300 (as seen from a side view) in an alternate form factor. Locator 3300 includes an integral body 3310, a display/user interface 3314, and one or more antennas, such as antennas 3320 and 3330, which may be internal to the body. In this alternate locator configuration, a safety light assembly 3350, with a plurality of LED light units 3360, which may be configured similarly to the safety light assemblies described previously herein, may be disposed on or within the locator body 3310.

In one or more exemplary embodiments, the electronic functions, methods and processes described herein and associated with locators and light assemblies may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure unless noted otherwise.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to GPS elements, camera elements, lighting assemblies and elements, and/or other elements may be implemented or performed in one or more processing elements with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The term "exemplary" is used herein to mean "serving as an example, instance, or illustration." Any aspect and/or embodiment described herein as "exemplary" is not necessarily to be construed as preferred or advantageous over other aspects and/or embodiments.

In addition, details regarding additional aspects, elements, components, features, functions, apparatus, and/or methods which may be used in conjunction with the embodiments described previously herein in various implementations are described in the incorporated applications of the assignee of the instant application.

It is understood that the specific order or hierarchy of steps or stages in the processes and methods disclosed are examples of exemplary approaches. Based upon design preferences, it is understood that the specific order or hierarchy of steps in the processes may be rearranged while remaining within the spirit and scope of the present disclosure. Any accompanying process or method claims present elements of the various steps in a sample order, however, this is not meant to be limiting unless specifically noted.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the presently claimed invention is not intended to be limited to the aspects shown herein but is to be accorded the widest scope consistent with the principles and novel features disclosed herein. It is intended that the following claims and their equivalents define the scope of the invention.

We claim:

1. A buried utility locator apparatus, comprising:
a locator body; and
an antenna node including twelve antenna elements positioned about a within a spherical shaped enclosure, wherein each antenna element includes an output for providing electrical output signals corresponding to sensed magnetic fields.

2. The locator apparatus of claim 1, further including an electronic circuit having inputs operatively coupled to the antenna element outputs for receiving the electrical output signals and generating information associated with a hidden or buried utility from which magnetic field signals are emitted.

3. The locator apparatus of claim 1, wherein the antenna elements are antenna coils each having an axis perpendicular to a plane through the antenna coils.

4. The locator apparatus of claim 3, wherein the axes perpendicular to a plane of the antenna elements intersect at a common point.

5. The locator of claim 4, wherein the antenna elements are circular, and the common point is equidistant to the center of each of the antenna elements.

6. The locator of claim 1, wherein the antenna elements are positioned in a dodecahedral orientation on the supporting structure.

7. The locator of claim 6, wherein the antennas elements are coil antennas.

8. The locator of claim 1, further comprising a substantially spherically shaped case enclosing the twelve antenna elements.

9. The locator of claim 7, wherein each of the coil antennas include a metal core comprising a thin metallic structure formed with a plurality of ridges defining a series of U-shaped grooves for supporting windings of the coil antennas.

10. The locator of claim 9, wherein each of the windings of the coil antennas comprises a plurality of strands of insulated wire and a low-dielectric insulating layer.

11. The locator of claim 1, further comprising a safety lighting assembly, disposed on or within the locator body, for generating output light.

12. The locator of claim 11, wherein the safety lighting assembly comprises a plurality of LED light units for generating fan-shaped substantially planar light beams.

13. The locator of claim 11, wherein the locator body includes a mast and wherein the safety lighting assembly is disposed on the mast.

14. The locator of claim 1, wherein the locator body includes a head unit and wherein the safety lighting assembly is disposed on or within the head unit.

15. The locator of claim 1, further comprising one or more GPS antennas coupled to or on or within the body.

16. The locator of claim 1, further comprising one or more GPS antennas coupled to or on or within the antenna node.

17. The locator of claim 15, further comprising one or more GPS sensors coupled to the one or more GPS antennas.

18. The locator of claim 1, further comprising one or more ISM antennas coupled to or on or within the locator body or the antenna node.

19. A buried utility locator, comprising:
- a locator shell;
- an antenna node including twelve antenna elements arranged in a dodecahedral shape, wherein each antenna element includes an output for providing electrical output signals corresponding to sensed magnetic fields; and
- an electronic circuit having inputs operatively coupled to the antenna element outputs for receiving the electrical output signals and generating information associated with a hidden or buried utility from which magnetic field signals are emitted;
- wherein the antenna elements are antenna coils each having an axis perpendicular to a plane through the antenna coils.

20. The locator of claim 19, wherein the shell comprises one of an elliptical shape, a rectangular shape, and a teardrop shape.

* * * * *